United States Patent
Tamura

(10) Patent No.: US 7,882,125 B2
(45) Date of Patent: Feb. 1, 2011

(54) DOCUMENT MANAGING SYSTEM, METHOD AND APPARATUS, PRINTING APPARATUS AND INFORMATION PROCESSING APPARATUS FOR THE SYSTEM, PROGRAM FOR IMPLEMENTING THE METHOD, AND STORING MEDIUM STORING THE PROGRAM

(75) Inventor: Makiya Tamura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 288 days.

(21) Appl. No.: 11/384,654

(22) Filed: Mar. 20, 2006

(65) Prior Publication Data

US 2006/0218142 A1 Sep. 28, 2006

(30) Foreign Application Priority Data

Mar. 22, 2005 (JP) .............................. 2005-082145

(51) Int. Cl.
G06F 17/30 (2006.01)
(52) U.S. Cl. ...................................... 707/769; 358/1.15
(58) Field of Classification Search ................. 707/769; 358/1.15
See application file for complete search history.

(56) References Cited

U.S. PATENT DOCUMENTS

| | | | | |
|---|---|---|---|---|
| 5,095,369 A * | 3/1992 | Ortiz et al. | .................. | 358/296 |
| 5,146,600 A * | 9/1992 | Sugiura | .................. | 707/104.1 |
| 5,544,360 A * | 8/1996 | Lewak et al. | .................. | 707/1 |
| 5,832,191 A * | 11/1998 | Thorne | ....................... | 358/1.15 |
| 6,307,640 B1 * | 10/2001 | Motegi | ....................... | 358/1.14 |
| 6,337,745 B1 * | 1/2002 | Aiello et al. | ................ | 358/1.15 |
| 6,738,768 B1 * | 5/2004 | Johnson | .......................... | 707/7 |
| 6,765,686 B2 | 7/2004 | Maruoka | | |
| 7,188,311 B2 | 3/2007 | Tanaka et al. | | |
| 2001/0006389 A1 * | 7/2001 | Nanba et al. | ................. | 345/418 |
| 2001/0012124 A1 * | 8/2001 | Morikawa | .................... | 358/296 |
| 2001/0038461 A1 * | 11/2001 | Murakami et al. | ......... | 358/1.13 |
| 2001/0038462 A1 * | 11/2001 | Teeuwen et al. | ........... | 358/1.15 |
| 2002/0105666 A1 * | 8/2002 | Sesek | ......................... | 358/1.14 |
| 2002/0112022 A1 * | 8/2002 | Kazar et al. | .................. | 709/217 |
| 2003/0056176 A1 | 3/2003 | Tanaka et al. | | |
| 2003/0067625 A1 * | 4/2003 | Kim | .......................... | 358/1.15 |
| 2003/0137680 A1 | 7/2003 | Maruoka | | |
| 2003/0169446 A1 * | 9/2003 | Grohs et al. | ................ | 358/1.15 |

(Continued)

FOREIGN PATENT DOCUMENTS

JP 08087518 A * 4/1996

(Continued)

*Primary Examiner*—James Trujillo
*Assistant Examiner*—William Spieler
(74) *Attorney, Agent, or Firm*—Rossi, Kimms & McDowell LLP

(57) ABSTRACT

A document managing system that is capable of realizing enhanced operability in inputting a search condition or the like when any of registered documents is searched for and printed. A document is registered in a document managing apparatus. A search condition to search through the registered documents for a specific document is registered in the document managing apparatus. A list of the registered search conditions is transmitted to a printing apparatus. The registered documents for a document that matches the selected search condition are searched through, by using a search condition selected from the transmitted list of the search conditions. The document that matches the selected search condition is transmitted to the printing apparatus.

16 Claims, 26 Drawing Sheets

U.S. PATENT DOCUMENTS

| | | | |
|---|---|---|---|
| 2004/0125401 A1* | 7/2004 | Earl et al. | 358/1.15 |
| 2004/0143566 A1* | 7/2004 | Fukasawa | 707/1 |
| 2004/0218205 A1* | 11/2004 | Irwin et al. | 358/1.15 |
| 2005/0068566 A1* | 3/2005 | Nishiguchi | 358/1.15 |
| 2005/0131831 A1* | 6/2005 | Fieldson | 705/59 |
| 2006/0010097 A1* | 1/2006 | Hashimoto | 707/1 |

FOREIGN PATENT DOCUMENTS

| | | |
|---|---|---|
| JP | 11-215358 A | 8/1999 |
| JP | 2001-222525 A | 8/2001 |
| JP | 2001-282841 A | 10/2001 |
| JP | 2002-183200 A | 6/2002 |
| JP | 2002-304416 A | 10/2002 |
| JP | 2003-162407 A | 6/2003 |
| JP | 2005-025541 A | 1/2005 |
| JP | 2005-062969 A | 3/2005 |

* cited by examiner

*FIG. 21*

PAGE SETTING
ORIGINAL SIZE:A4
PAPER SIZE: 210.0 mm X 297.0 mm, 8.27 in X 11.69 in
OUTPUT PAPER SIZE: SAME AS ORIGINAL SIZE
PAPER SIZE: 210.0 mm X 297.0 mm, 8.27 in X 11.69 in
NUMBER OF COPIES: 1 COPY
PRINTING DIRECTION: VERTICAL
PAGE LAYOUT: 1 PAGE/SHEET (STANDARD)
MAGNIFICATION DESIGNATION: NONE 100%
STAMP: NONE

PAGE FRAME: NO FRAME
DATE: NOT PRINTED
USER NAME: NOT PRINTED
PAGE NUMBER: NOT PRINTED

PROCESSING METHOD: NO OVERLAY PRINTING

FINISH
PRINTING METHOD: SINGLE-SIDED PRINTING
COMBINATION OF SHEETS DIFFERENT IN SIZE OR DIRECTION: NO
BINDING DIRECTION: BIND LONGER SIDE (LEFT)
BINDING MARGIN: 0 mm
PAPER DISCHARGE METHOD: NOT DESIGNATED

DOCUMENT MANAGING SYSTEM, METHOD
AND APPARATUS, PRINTING APPARATUS
AND INFORMATION PROCESSING
APPARATUS FOR THE SYSTEM, PROGRAM
FOR IMPLEMENTING THE METHOD, AND
STORING MEDIUM STORING THE
PROGRAM

BACKGROUND OF THE INVENTION

1. Field of the Invention

The present invention relates to a document managing system and method in which documents to be printed by a printing apparatus are managed by a document managing apparatus, and to the document managing apparatus, the printing apparatus, and an information processing apparatus for the system, a program for implementing the method, and a storing medium storing the program.

2. Description of the Related Art

Conventionally, a document managing system is known in which registered documents are searched through and a document found by the search is printed by a plurality of printing apparatuses connected to a network. A document managing system providing a document managing service via, for example, the Internet is provided with a document searching function for searching for any of registered documents (see, Japanese Laid-open Patent Application (Kokai) No. 2001-222525). In this document managing system, a plurality of search items are settable in a document management information area of each electronic document. When, for example, a document management period is set as a search item, an external access to the electronic document is inhibited after this document management period is expired. It is also possible to conduct a search and to select and print an electronic document that matches a search condition, out of registered electronic documents.

However, the aforesaid conventional document managing system had the following problems. That is, when a document provided from the document managing service via the Internet is printed by a printing apparatus such as a copying machine installed in, for example, a convenience store, namely, when the document is printed by a printing apparatus in a place where there is no PC, a user inputs a search condition by using an operation part of the printing apparatus and a document that matches the search condition is selected and printed. In this case, the operation part of the printing apparatus, which is generally constituted of a touch panel, is very poor in operability and is not easy to use if the user tries to input a search condition requiring many and complicated inputs.

Moreover, when a printing format different from a default printing format is to be set for printing, it is necessary to newly set a printing format every time a document is printed even if a printing format for printing the document is the same as that previously set, which was troublesome.

SUMMARY OF THE INVENTION

It is an object of the present invention to provide a document managing system, method and apparatus, a printing apparatus and an information processing apparatus for the system, a program for implementing the method, and a storing medium storing the program, which can realize enhanced operability in inputting a search condition or the like when any of registered documents is searched for and printed. It is another object of the present invention to provide a document managing system, method and apparatus, a printing apparatus and an information processing apparatus for the system, a program for implementing the method, and a storing medium storing the program, which can eliminate the need for setting a printing format many times when a document is repeatedly printed with the same printing format.

To attain the above object, in a first aspect of the present invention, there is provided a document managing system comprising a document storing unit that stores a document registered in a document managing apparatus, a search condition storing unit that stores a search condition to search through the registered documents for a specific document, wherein the search condition is registered in the document managing apparatus, a list transmitting unit that transmits a list of the registered search conditions to a printing apparatus, a searching unit that, by using a search condition selected from the transmitted list of the search conditions, searches through the registered documents for a document that matches the selected search condition, and a document transmitting unit that transmits to the printing apparatus the document that matches the selected search condition.

Preferably, an information processing apparatus as well as the document managing apparatus and the printing apparatus are connected to a network, and the search condition storing unit is capable of storing a search condition that is registered in the document managing apparatus from the information processing apparatus via the network, and is capable of changing or deleting the registered search condition.

Preferably, an information processing apparatus as well as the document managing apparatus and the printing apparatus are connected to a network, and the document storing unit is capable of storing a document that is registered in the document managing apparatus from the information processing apparatus via the network, and is capable of deleting the registered document.

Preferably, the document managing system further comprises a printing apparatus managing unit that registers a printing apparatus in the document managing apparatus or deleting the registered printing apparatus from the document managing apparatus.

Preferably, the list transmitting unit transmits to the printing apparatus the list of the registered search conditions in response to a request from the printing apparatus, and the printing apparatus displays the transmitted list of the search conditions on a screen to cause a user to select a specific search condition from the displayed list of the search conditions.

Preferably, the document managing system further comprises a history managing unit that manages a history of a document that has ever been transmitted to the printing apparatus, when the document that matches the search condition is the document that has ever been transmitted to the printing apparatus, the document transmitting unit does not transmit to the printing apparatus the document that matches the search condition.

To attain the above object, in a second aspect of the present invention, there is provided a document managing system comprising a document storing unit that stores a document registered in a document managing apparatus, a search condition storing unit that stores a search condition to search through the registered documents for a specific document and stores a printing format setting corresponding to the search condition, wherein the search condition is registered in the document managing apparatus, a search condition transmitting unit that transmits a list of the registered search conditions to a printing-apparatus, a searching unit that, by using a search condition selected from the transmitted list of the search conditions, searches through the registered documents for a document that matches the selected search condition, and a document transmitting unit that transmits to the printing apparatus the document that matches the selected search condition and a printing format setting corresponding to the selected search condition.

Preferably, the search condition storing unit stores the printing format setting and the search condition, with the printing format setting transmitted from the printing apparatus corresponding to the registered search condition.

Preferably, the search condition transmitting unit transmits to the printing apparatus the list of the registered search conditions in response to a request from the printing apparatus, and the printing apparatus displays the transmitted list of the search conditions to cause a user to select a specific search condition from the displayed list of the search conditions.

Preferably, the document managing system further comprises a history managing unit that manages a history of a document that has ever been transmitted to the printing apparatus, when the document that matches the search condition is the document that has ever been transmitted to the printing apparatus, said document transmitting unit does not transmit to the printing apparatus the document that matches the search condition.

To attain the above object, in a third aspect of the present invention, there is provided a document searching method for searching for a document, comprising a document registering step of registering a document in a document managing apparatus, a search condition registering step of registering in the document managing apparatus a search condition to search through the registered documents for a specific document, a search condition transmitting step of transmitting a list of the registered search conditions to a printing apparatus, a searching step of, by using a search condition selected from the transmitted list of the search conditions, searching through the registered documents for a document that matches the selected search condition, and a document transmitting step of transmitting to the printing apparatus the document that matches the selected search condition.

To attain the above object, in a fourth aspect of the present invention, there is provided a document searching method for searching for a document comprising a document registering step of registering a document in a document managing apparatus, a search condition registering step of registering in the document managing apparatus a printing format setting and a search condition to search through the registered documents for a specific document, a search condition transmitting step of transmitting a list of the registered search conditions to a printing apparatus, a searching step of, by using a search condition selected from the transmitted list of the search conditions, searching through the registered documents for a document that matches the selected search condition, and a document transmitting step of transmitting to the printing apparatus the document that matches the selected search condition and a printing format setting corresponding to the selected search condition.

To attain the above object, in a fifth aspect of the present invention, there is provided a document managing apparatus for managing documents, comprising a document storing unit that stores a document, a search condition storing unit that stores a search condition to search through the stored documents for a specific document, a search condition transmitting unit that transmits to a printing apparatus a list of the stored search conditions, a searching unit that, by using a selected search condition, searches through the stored documents for a document that matches the selected search condition, and a document transmitting unit that transmits to the printing apparatus the document that matches the selected search condition.

Preferably, the search condition corresponds to a printing format setting.

To attain the above object, in a sixth aspect of the present invention, there is provided a printing apparatus printing a document registered in a document managing apparatus, comprising a search condition obtaining unit that obtains a list of search conditions via a network, a search condition selecting unit that selects a specific search condition from the obtained list of the search conditions, a search condition transmitting unit that transmits the selected search condition to the document managing apparatus to cause the document managing apparatus to search for a document that matches the transmitted search condition, and a document receiving unit that receives the document that matches the selected search condition.

Preferably, the search condition transmitting unit transmits a printing format setting together with the selected search condition.

Preferably, the search condition selecting unit selects a specific search condition from search conditions corresponding to a printing format setting and search conditions not corresponding to the printing format setting.

To attain the above object, in a seventh aspect of the present invention, there is provided an information processing apparatus comprising a document registering unit that registers a document in a document managing apparatus which transmits to a printing apparatus a search condition to search for the registered document, and a search condition registering unit that registers the search condition in the document managing apparatus.

Preferably, the information processing apparatus further comprises a document deleting unit that deletes the document registered in the document managing apparatus, and a search condition changing/deleting unit that changes or deletes the search condition registered in the document managing apparatus.

Preferably, the information processing apparatus further comprises a printing apparatus registering unit that registers the printing apparatus in the document managing apparatus.

To attain the above object, in an eighth aspect of the present invention, there is provided a program including a computer-readable program code for realizing the document managing system according to the first aspect of the present invention.

To attain the above object, in an ninth aspect of the present invention, there is provided a program including a computer-readable program code for realizing the document managing system according to the second aspect of the present invention.

To attain the above object, in an tenth aspect of the present invention, there is provided a storing medium storing the program according to the eighth aspect of the present invention.

To attain the above object, in an eleventh aspect of the present invention, there is provided a storing medium storing the program according to the ninth aspect of the present invention.

According to the first aspect and the third aspect of the present invention, since the search conditions are transmitted to the printing apparatus from the document managing apparatus, operability in inputting a search condition or the like can be enhanced when any of the registered documents is searched for and printed. Moreover, it is possible to register/change/delete the search condition by using an information processing apparatus whose input operation is easy. It is also possible to register/delete a document by using the information processing apparatus whose input operation is easy. It is possible to manage the printing apparatus capable of printing and outputting a document managed by the document managing apparatus. Furthermore, repeated printing of the same document can be avoided.

According to the second aspect and the fourth aspect of the present invention, since a document that matches the search condition selected at the printing apparatus and the printing format setting appended to the search condition are transmitted to the printing apparatus from the document managing device, there is no need to set the printing format many times when the same printing format is repeatedly used for printing. The printing format setting can be easily registered. The search condition can be easily selected at the printing apparatus side. Moreover, repeated printing of the same document can be avoided.

The above and other objects, features, and advantages of the invention will become more apparent from the following detailed description taken in conjunction with the accompanying drawings.

BRIEF DESCRIPTION OF THE DRAWINGS

FIG. 21 is a chart showing an example of printing format setting;

DETAILED DESCRIPTION OF THE PREFERRED EMBODIMENTS

Embodiments of a document managing system, method and apparatus, a printing apparatus and an information processing apparatus for the system, a program for implementing the method and a storing medium storing the program of the present invention will now be described with reference to the drawings. The document managing system of this embodiment is applied to a system which prints documents provided via the Internet.

Figure 1:
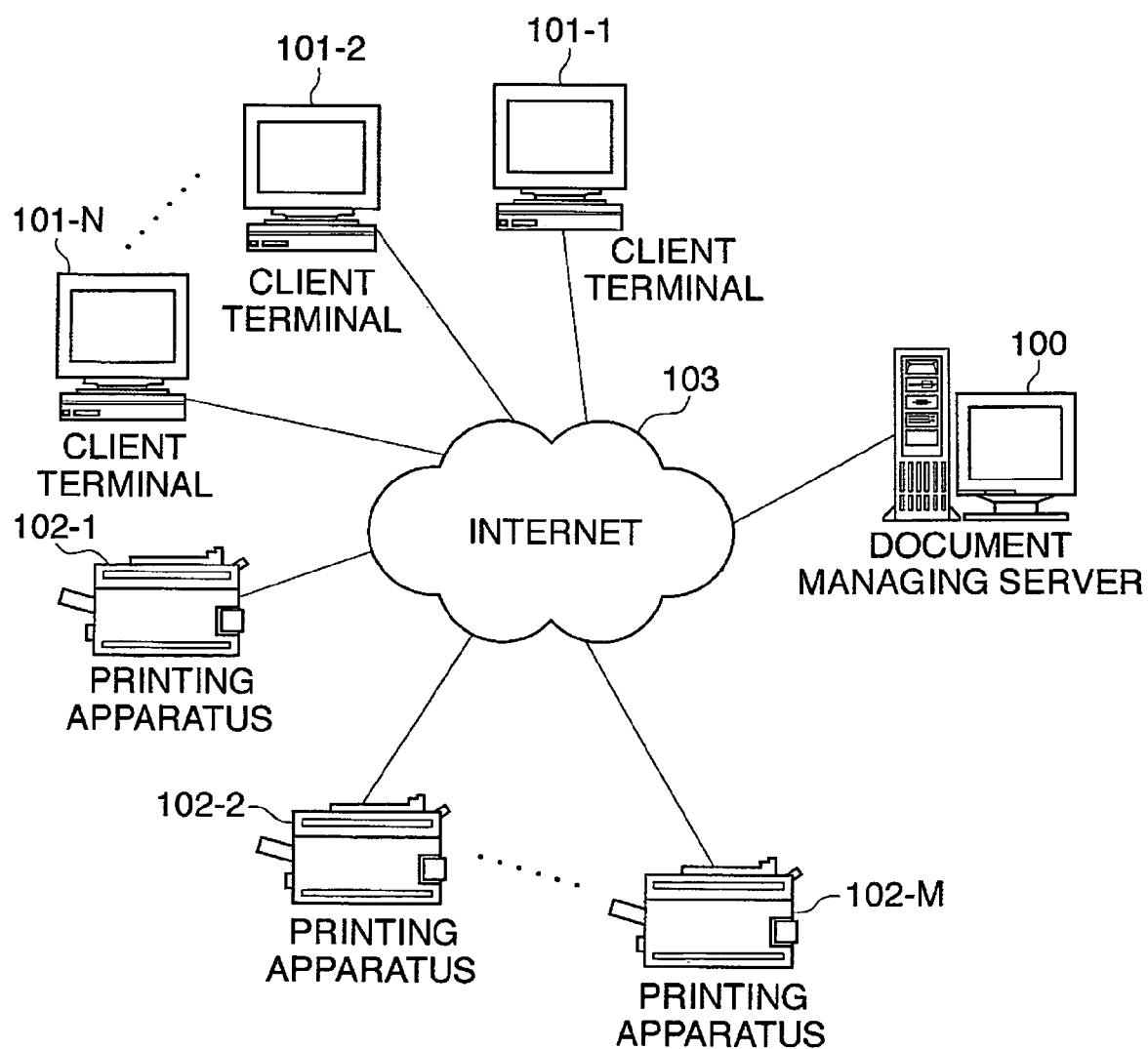
FIG. 1 is a view showing the configuration of a document managing system according to a first embodiment of the present invention.

FIG. 1 is a view showing the configuration of a document managing system according to a first embodiment of the present invention. This document managing system registers search conditions for documents in advance and also manages printing apparatuses and printing format settings as information pertaining to the search conditions. The document managing system is configured such that a document managing server 100, a plurality of client terminals 101-1, 101-2, . . . 101-N, and a plurality of printing apparatuses 102-1, 102-2, . . . 102-M are connected to one another via a network such as the Internet 103.

Here, the client terminals 101-1, 101-2, . . . 101-N have the same structure and N is an arbitrary natural number. To refer to any one client terminal out of the plural client terminals 101-1, 101-2, . . . 101-N, it will be simply described as a client terminal 101. Further, the printing apparatuses 102-1, 102-2, . . . 102-M also have the same structure and M is an arbitrary natural number. To refer to any one printing apparatus out of the plural printing apparatuses 102-1, 102-2, . . . 102-M, it will be simply described as a printing apparatus 102. In this embodiment, the network is the Internet 103, but may be other network such as a LAN (Local Area Network).

Figure 2:
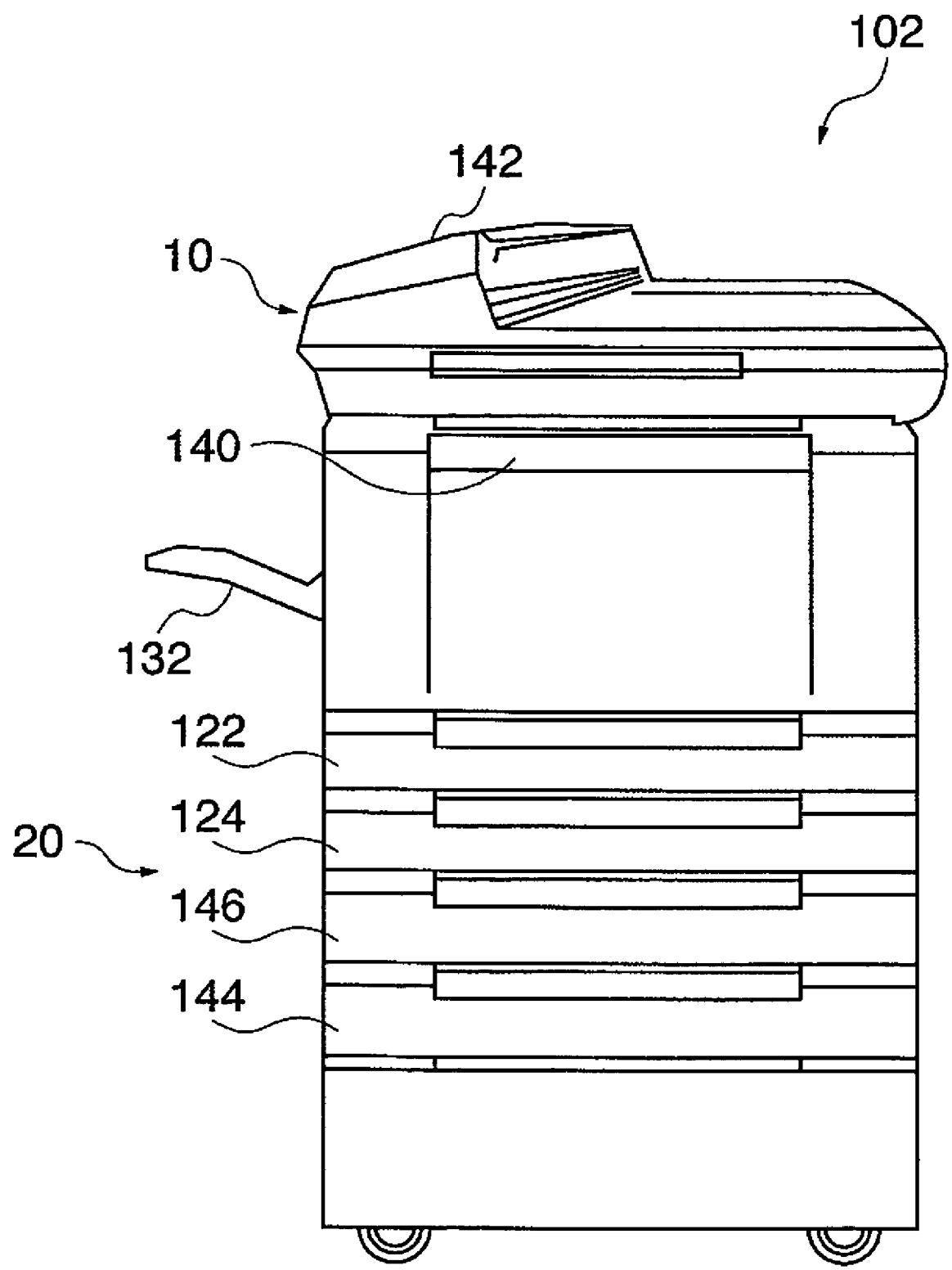
FIG. 2 is a view showing the external structure of a printing apparatus 102 in FIG. 1.

FIG. 2 is a view showing the external structure of the printing apparatus 102 in FIG. 1. The printing apparatus 102 has a scanner part 10 and a printer part 20, and is constituted as a multifunctional printer having a printing function, a copying function, a facsimile function, and so on. The scanner part 10 illuminates an original image by a lamp, reads a reflected light from the original image by a CCD line sensor (not shown), and converts the reflected light into an electrical signal to process the same as image data. When originals are to be read, original sheets are set on an original feeder 142, and when a user gives a read start instruction via an operation part 140, the original feeder 142 feeds the original sheets one by one.

The printer part 20 converts the image data into an image on a recording sheet, and in this embodiment, an electrophotographic method using a photosensitive drum or a photosensitive belt is adopted for printing. A printing operation is started by an instruction from a controller unit 30 provided in the apparatus. The printer part 20 has a plurality of paper feed stages and paper cassettes (paper feeding units) 122, 124, 146, 144 corresponding to the respective paper feed stages so that different paper sizes or different paper directions can be selected. Further, a sheet on which an image is formed is discharged onto a paper discharge tray 132.

Figure 3:
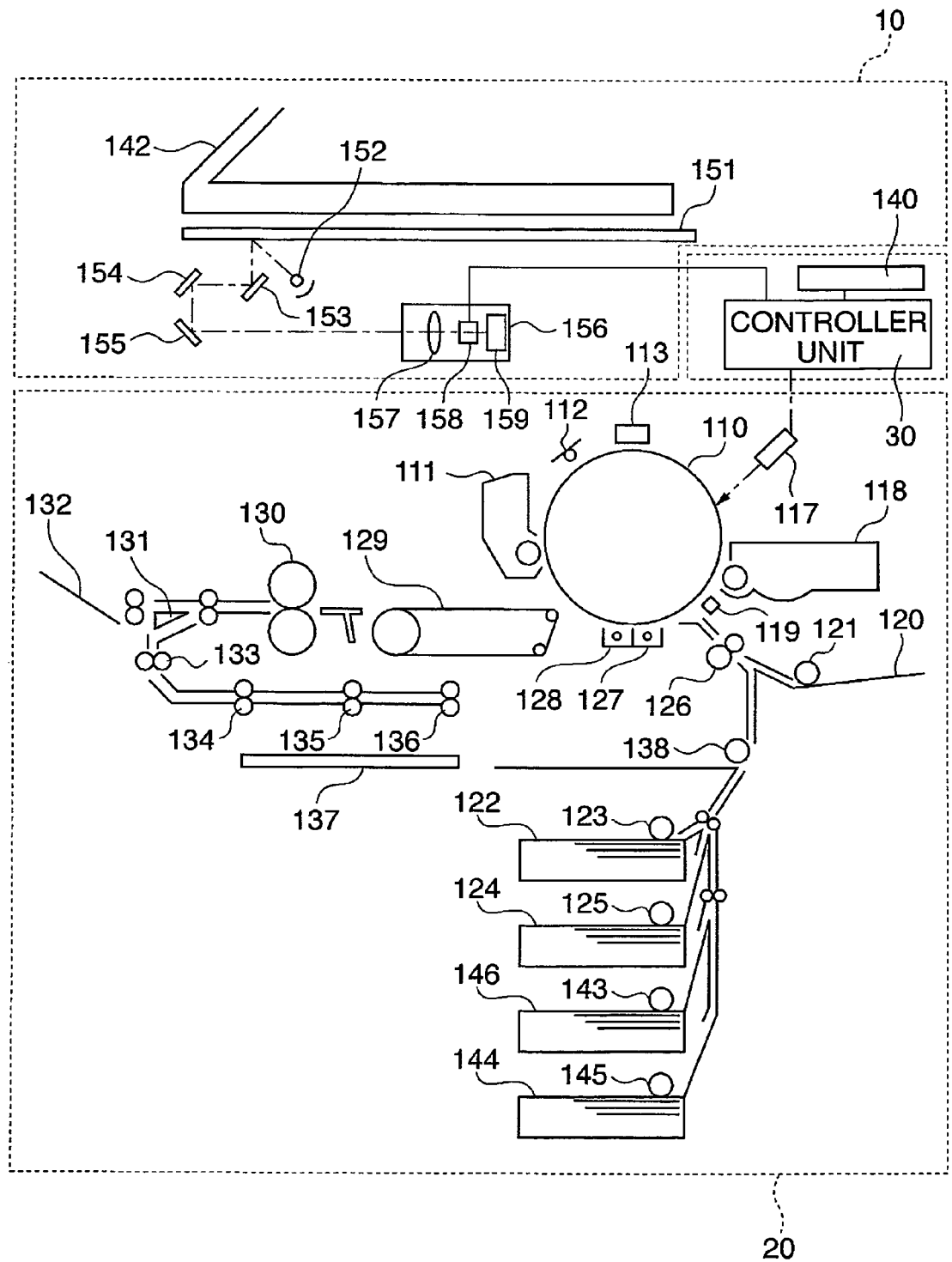
FIG. 3 is a vertical cross-sectional view showing the internal structure of the printing apparatus 102 of FIG. 2.

FIG. 3 is a vertical cross-sectional view showing the internal structure of the printing apparatus 102 of FIG. 2. On the scanner part 10 side, originals fed from the automatic original feeding device (original feeder) 142 are placed at a predetermined position on an original table glass 151 in sequence. An original illuminating lamp 152 is constituted of, for example, a halogen lamp, and exposes the original placed on the original table glass 151 to light. Scanning mirrors 153, 154, 155 are housed in an optical scanning unit (not shown) and guide the reflected light from the original to a CCD unit 156 while reciprocating. The CCD unit 156 includes: an imaging lens 157 forming an image of the reflected light from the original on an image sensor; the image sensor 158 constituted of, for example, a CCD; a CCD driver 159 driving the image sensor 158; and so on. An image signal outputted from the image sensor 158 is inputted to the controller unit 30 after converted to, for example, 8-bit digital data.

On the printer part 20 side, in preparation for image forming, the photosensitive drum 110 is destaticized by a preexposure lamp 112. A primary charger 113 uniformly charges the photosensitive drum 110. A semiconductor laser 117 as exposing means exposes the photosensitive drum 110 to light based on the image data processed in the controller unit 30 to form an electrostatic latent image. A developing device 118 contains a black developer (toner). A pretransfer charger 119 applies a high voltage before a toner image developed on the photosensitive drum 110 is transferred onto a sheet. When respective paper feed rollers 121, 123, 125, 143, 145 are driven, transfer sheets in a manual paper feeding unit 120 and in the paper feeding units 122, 124, 146, 144 are fed into the apparatus, and after stopping once at a position of a registration roller 126, the transfer sheets are fed again so as to coincide with the read timing of the image formed on the photosensitive drum 110. A transfer charger 127 transfers the toner image developed on the photosensitive drum 110 onto the fed transfer sheet. A detach charger 128 detaches the transfer sheet, for which the transfer operation is finished, from the photosensitive drum 110. Residual toner on the photosensitive drum 110 which is not transferred is collected by a cleaner 111.

A conveyer belt 129 conveys the transfer sheet having undergone the transfer process to a fixing unit 130, where the toner image is fixed by, for example, heating. A flapper 131 controls a transport path of the transfer sheet having undergone the fixing process to an arrangement direction of either a sorter 132 or an intermediate tray 137. Further, paper feed rollers 133 to 136 feed the transfer sheet having undergone the fusing process once to the intermediate tray 137, with the transfer sheet being reversed (multi-layer) or being kept unreversed (double-sided). A re-feed roller 138 carries the transfer sheet placed on the intermediate tray 137 again to the position of the registration roller 126. As will be described later, the controller unit 30 has a microcomputer, an image processing part, and so on, and controls the above-described image forming operation according to an instruction from the operation part 140. Incidentally, in this embodiment, the printing apparatus for black-and-white printing is shown, but it goes without saying that the printing apparatus may be capable of color printing.

Figure 4:
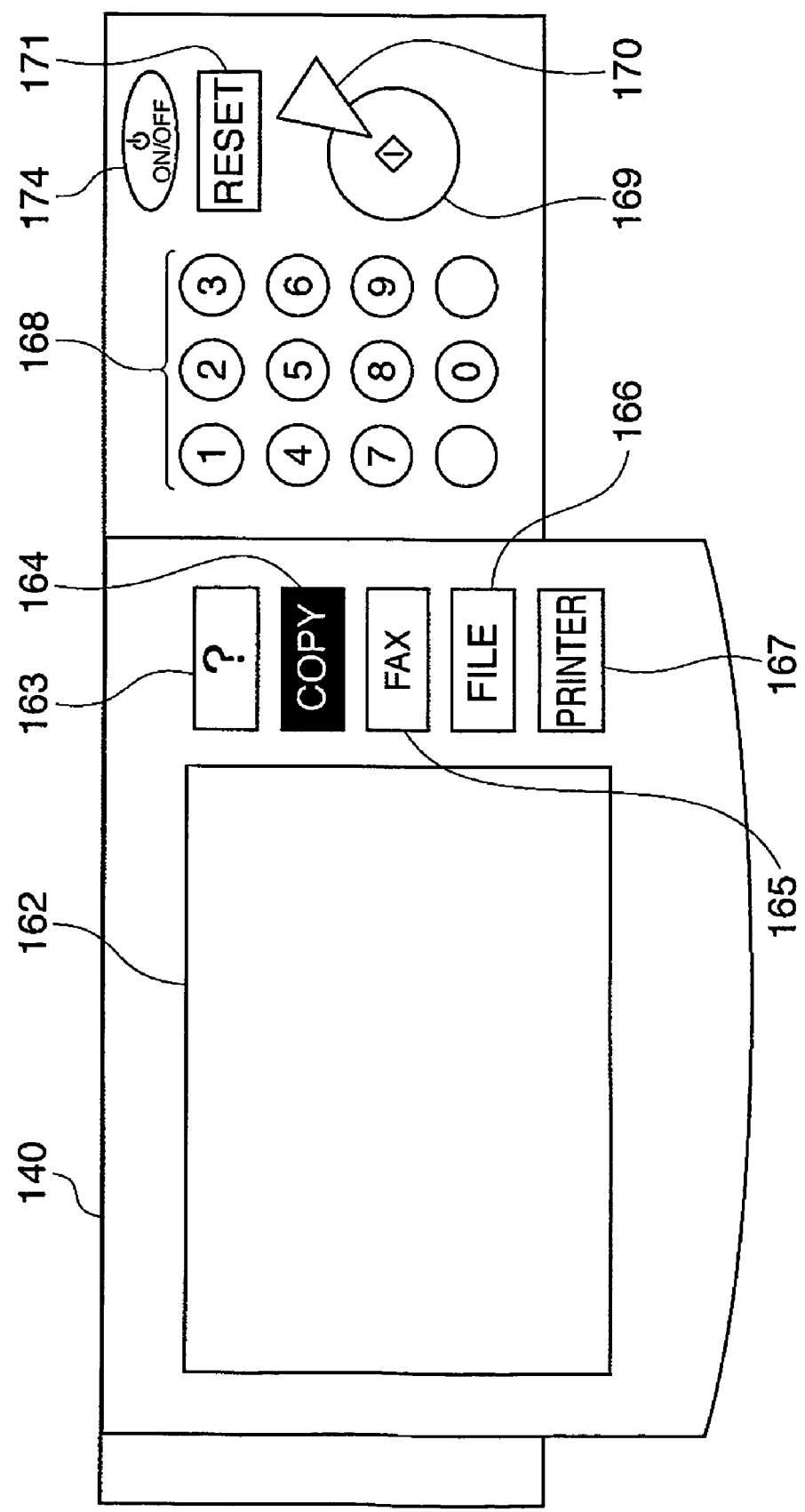
FIG. 4 is a view showing the external appearance of an operation part 140 in FIG. 2.

FIG. 4 is a view showing the external appearance of the operation part 140 in FIG. 2. The operation part (operation panel) 140 includes various kinds of keys and various kinds of switches in addition to an LCD display part 162. The LCD display part 162 is an LCD screen on which a touch panel sheet is bonded. The LCD display part 162 displays operation windows of the system and when a displayed key is pressed down, transmits position information thereof to the controller unit 30.

A numeric keypad 168 is used for inputting numerals such as the number of copies. A start key 169 is used for starting a read operation of an original image. A stop key 170 is used for stopping a currently running operation. A reset key 171 is used for initializing the setting inputted from the operation part 140. A soft switch 174 is used for shifting the printing apparatus 102 to a sleep state and for activating the printing apparatus 102 from the sleep state. When a user presses down a guide key 163, not knowing a key function, explanation of the key is displayed. A copy mode key 164 is pressed down for starting a copying operation. A facsimile key 165 is pressed down when setting regarding the facsimile is to be made. A file key 166 is pressed down when file data is to be outputted. A printer key 167 is used when setting regarding print output from an external device such as a computer is to be made.

Figure 5:
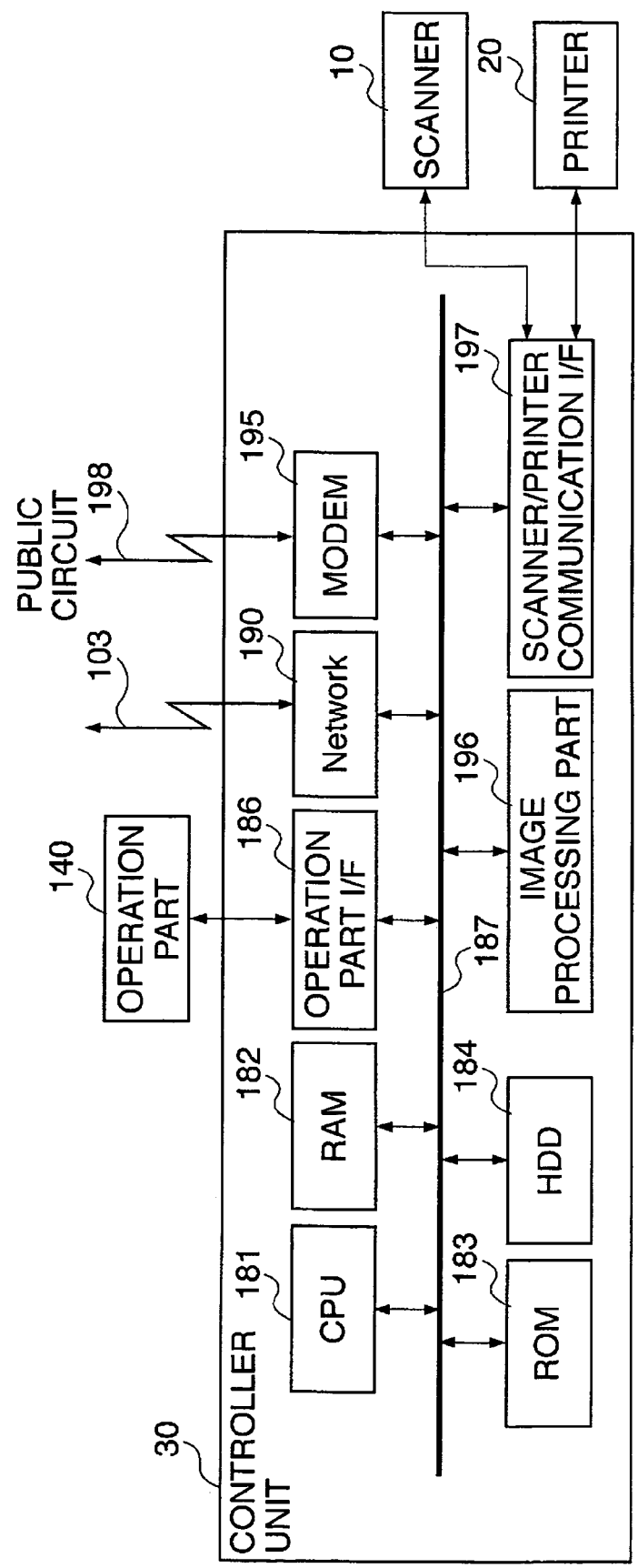
FIG. 5 is a block diagram showing the configuration of a controller unit 30 in FIG. 3.

FIG. 5 is a block diagram showing the configuration of the controller unit 30 in FIG. 3. The controller unit 30 is connected to the scanner part 10 and the printer part 20 and also to the Internet 103 and a public circuit (WAN), and has a CPU, a ROM, a RAM, a hard disk drive (HDD), an operation part interface (I/F), a network I/F, a modem, and so on.

A CPU 181 is a controller controlling the whole system. A RAM 182 is a system work memory used for the operation of the CPU 181 and is also an image memory for temporarily storing image data. A ROM 183 is a boot ROM and stores a boot program of the system. A hard disk drive (HDD) 184 stores system software, image data, software counter values, and so on.

An operation part I/F 186 is an interface part with an operation part (UI) 140 and outputs image data for display to the operation part 140. The operation part I/F 186 plays a role of transmitting to the CPU 181 information inputted by a user via the operation part 140.

A network 190 is connected to the network 103 to receive/output information therefrom/thereto. A modem 195 is connected to the public circuit 198 to receive/output information therefrom/thereto. A scanner/printer communication I/F 197 is an interface (I/F) for communication with CPUs of the scanner part 10 and the printer part 20. An image processing part 196 performs various kinds of image processing on image data.

Figure 6:
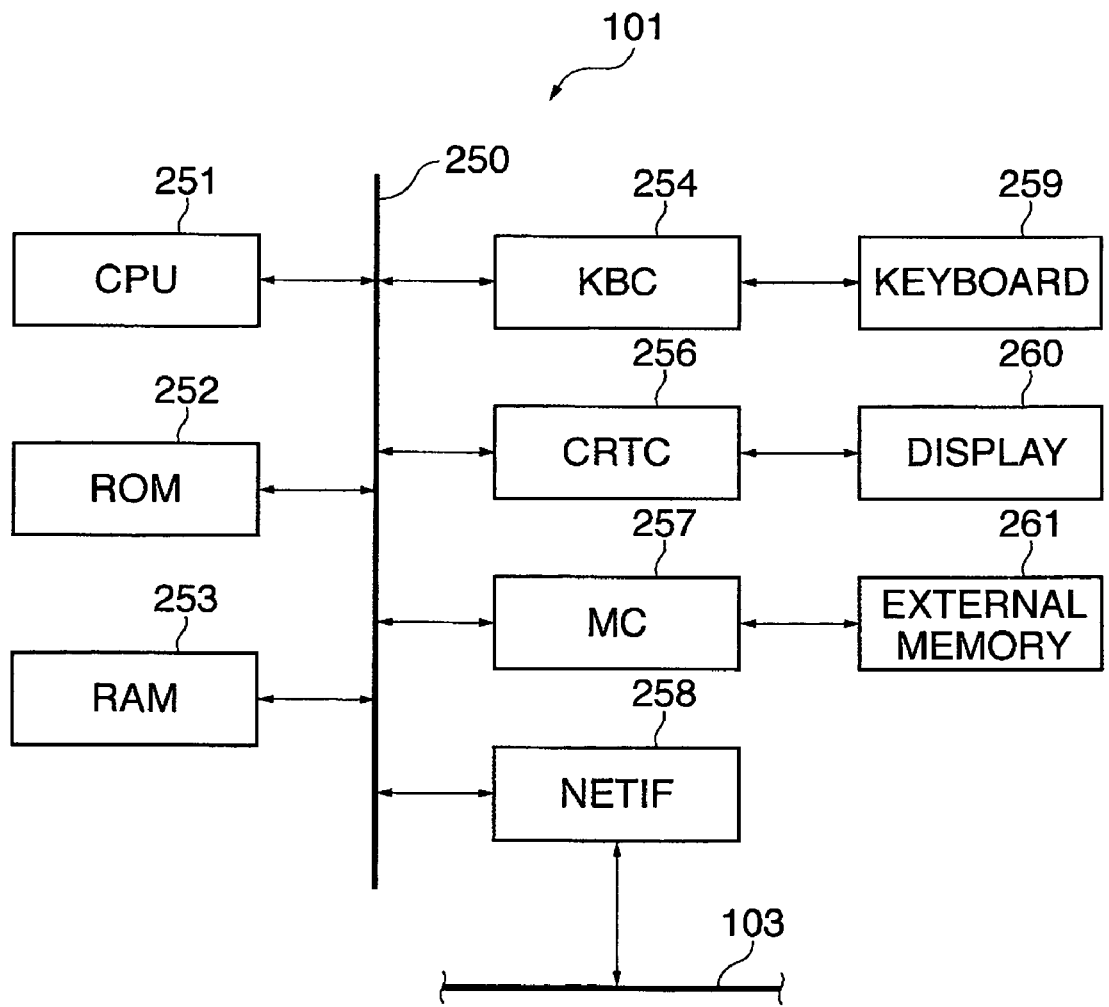
FIG. 6 is a block diagram showing the hardware configuration of a client terminal 101 in FIG. 1.

FIG. 6 is a block diagram showing the hardware configuration of the client terminal 101 in FIG. 1. The client terminal 101 is a typical information processing apparatus (computer) having a network browsing function, and includes a CPU 251, a ROM 252, a RAM 253, a keyboard controller (KBC) 254, a display controller (CRTC) 256, a memory controller (MC) 257, a network interface (NETIF) 258, and so on, which are connected to one another via a system bus 250.

The CPU 251 performs document processing and also centrally controls devices connected to the system bus 250. The ROM 252 stores control programs, font data used at the time of the document processing, and various kinds of data used for the document processing. The RAM 253 functions as a main memory, a work area, and the like of the CPU 251. The keyboard controller (KBC) 254 controls key input from a keyboard 259 and a pointing device (not shown). The display controller (QRTC) 256 controls the display on a display 260. As the display, a CRT is used here, but a liquid crystal display or the like may be used. The memory controller (MC) 257 controls accesses to an external memory 261 such as a hard disk (HD) or a flexible disk (FD) storing boot programs, various kinds of applications, font data, user files, edit files, and so on. The network I/F 258 is connected to the Internet 103 to perform control processing for the Internet 103.

In the client terminal 101 as structured above, the CPU 251 opens various kinds of registered windows to execute various kinds of data processing based on a command instructed with a mouse cursor (not shown) or the like on the display 260.

Figure 7:
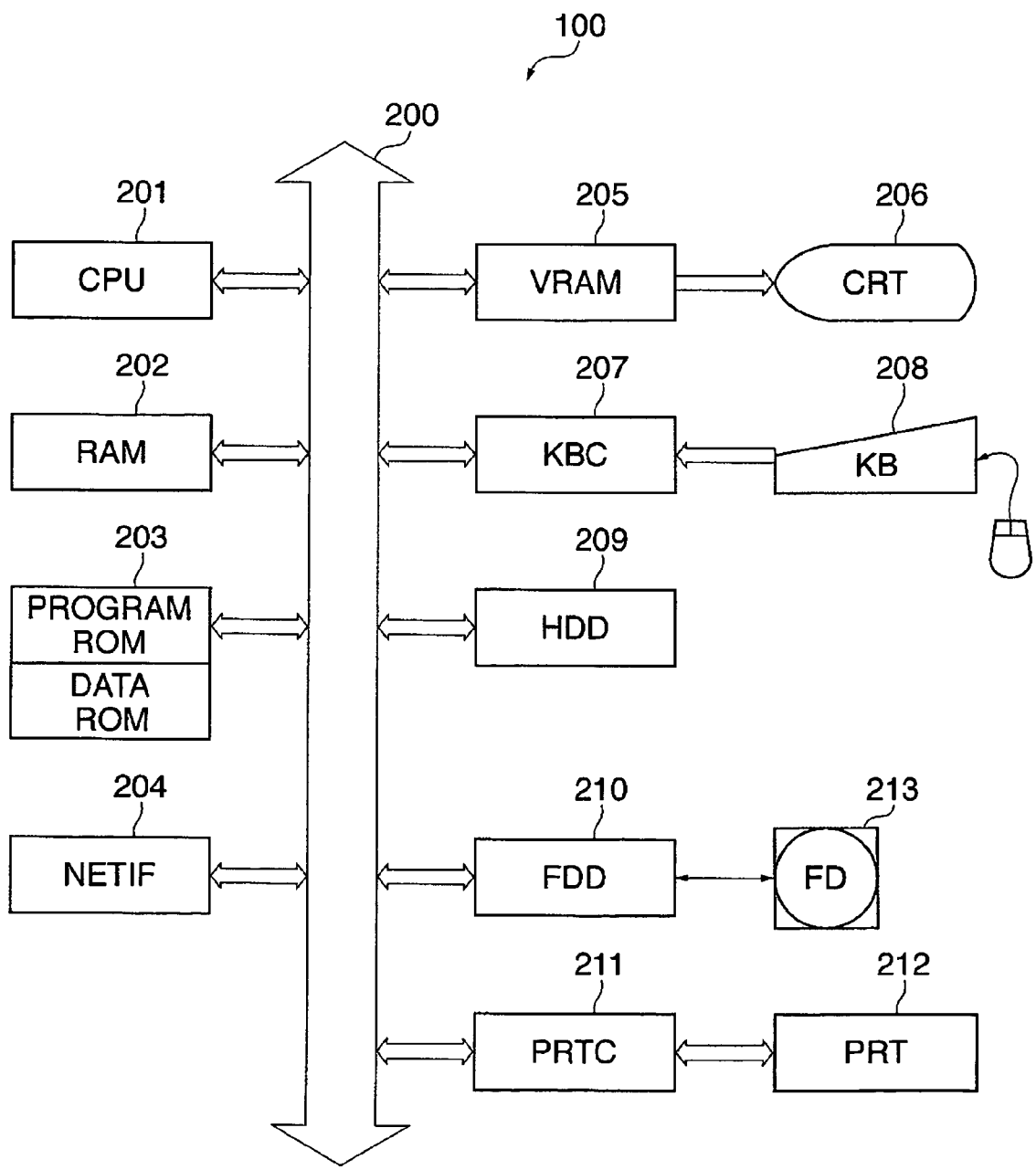
FIG. 7 is a block diagram showing the hardware configuration of a document managing server 100 in FIG. 1.

FIG. 7 is a block diagram showing the hardware configuration of the document managing server 100 in FIG. 1. The document managing server 100 is constituted of a general-purpose information processing apparatus (computer), and has a CPU 201, a RAM 202, a ROM 203, a network I/F (NETIF) 204, a video RAM (VRAM) 205, a keyboard controller (KBC) 207, a hard disk drive (HDD) 209, a flexible disk drive (FDD) 210, and a printer controller (PRTC) 211, which are connected to one another via a transmission bus 200.

The CPU (central processing unit) 201 controls information processing apparatuses and arithmetic operations thereof. The random access memory (RAM) 202 functions as a main memory of the CPU 201 and also functions as an area of an execution program, an execution area of this program, and a data area. The read-only memory (ROM) 203 stores a program which is the procedure for operation processing of the CPU 201. The ROM 203 includes a program ROM in which a basic software (OS) is recorded and a data ROM in which information necessary for system operation and so on are recorded. Instead of the ROM 203, the HDD 209 is sometimes used. The network interface (NETIF) 204 controls data transfer to/from the client terminals 101, the printing apparatuses 102, and so on via the Internet 103 and diagnoses a connection state for this data transfer. The video RAM (VRAM) 205 develops an image to be displayed on a screen of the CRT 206 and controls the display of the image. The display device (CRT) 206 such as a display is connected to the VRAM 205.

The controller (KBC) 207 controls input signals from an external input device 208. The external input device 208 accepts an operation by a user. Examples used as the external input device 208 are a keyboard and a pointing device such as a mouse. The hard disk drive (HDD) 209 is used for storing application programs and various kinds of data. The application program in this embodiment is software and so on for realizing various kinds of processing functions in this embodiment.

The external input/output device (FDD) 210 is, for example, a floppy (registered trademark) disk drive, a CD-ROM drive, or the like that inputs/outputs data from/to a removable disk and is used for reading from a recording medium of the aforesaid application program and for other purposes. A data recording medium (removable medium) 213 is a removable one from which data is read by the FDD 210, such as a magnetic recording medium (for example, a floppy (registered trademark) disk or an external hard disk), an optical recording medium (for example, a CD-ROM), a magnetic-optical recording medium (for example, an MO), or a semiconductor recording medium (for example, a memory card). Incidentally, the application program and the data stored in the HDD 209 can be stored in the FDD 210 for use.

The controller (PRTC) 211 controls output signals to the printing apparatus (PRT) 212. As the printing apparatus (PRT) 212, for example, an LBP (Laser Beam Printer) or the like is used. The transmission bus 200 is to connect the units to one another and is constituted of an address bus, a data bus, an input/output bus, and a control bus.

Figure 8:
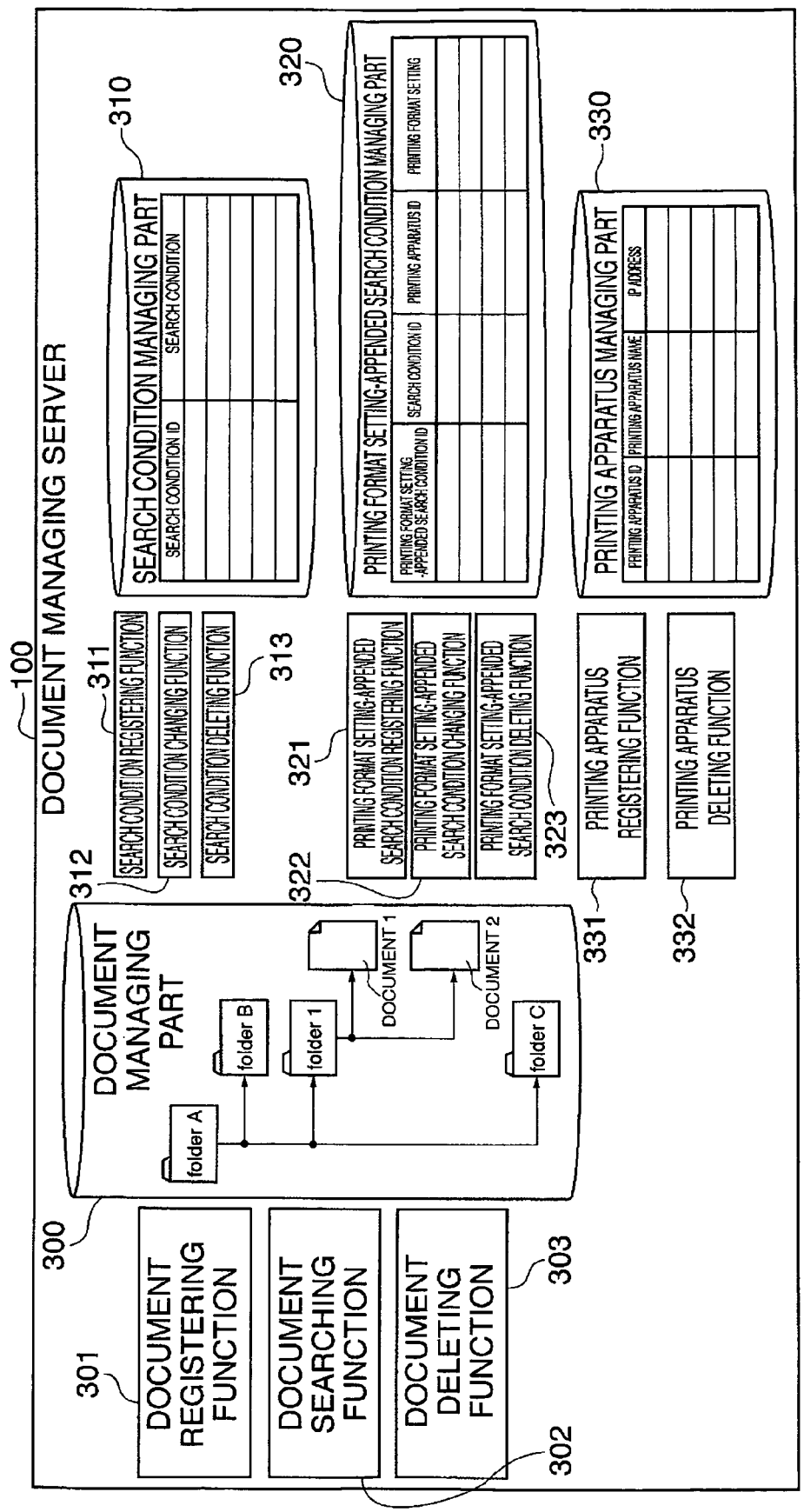
FIG. 8 is a diagram showing the functional configuration of the document managing server 100 of FIG. 7.

FIG. 8 is a diagram showing the functional configuration of the document managing server 100 in FIG. 7. The document managing server 100 has a document managing part 300, a search condition managing part 310, a printing format setting-appended search condition managing part 320, and a printing apparatus managing part 330, and further includes a document registering function 301, a document searching function 302, a document deleting function 303, a search condition registering function 311, a search condition changing function 312, a search condition deleting function 313, a printing format setting-appended search condition registering function 321, a printing format setting-appended search condition changing function 322, a printing format setting-appended search condition deleting function 323, a printing apparatus registering function 331, and a printing apparatus deleting function 332.

Each of the aforesaid managing parts is a file system or a database storing and managing information and stores the information by using one of the RAM 202, the HDD 209, and the FDD 210. Further, the information stored in each of these managing parts is directly accessible with a specific key or condition. Moreover, each of the aforesaid functions is realized as an application program executed by the CPU 201 or as a module operating as part of the program. The application program or the module is read from the ROM 203, the HDD 209, or the FDD 210 to be developed in the RAM 202.

When the client terminal 101 uploads to the document managing server 100 a document file (hereinafter simply referred to as "the document") held in the client terminal 101 by using a network browsing function, the document registering function 301 registers the uploaded document in the document managing part 300 in the document managing server 100. The document managing part 300 stores the document registered by the document registering function 301.

When the client terminal 101 requests the search for an arbitrary document under a designated search condition by utilizing the network browsing function, the document searching function 302 selects a document that matches the search condition out of the documents registered in the document managing part 300 and transmits to the client terminal 101 information on the selected document that matches the search condition. At this time, the information on the document transmitted to the client terminal 101 does not include an entity of the document but attribute information such as the document name and size is transmitted. The client terminal 101 displays the transmitted information on the document.

When the client terminal 101 requests information on documents under management at this instant by utilizing the network browsing function, the document deleting function 303 obtains the information from the document managing part 300 and transmits to the client terminal 101 the requested information on the documents under management. The client terminal 101 displays the transmitted information on the documents and requests the user to designate (input) a document to be deleted. When the user's input is finished, the client terminal 101 transmits an ID of the document to be deleted to the document deleting function 303. Based on the received ID of the document to be deleted, the document deleting function 303 deletes the designated document managed by the document managing part 300 and the information on the document.

The search condition registering function 311, the search condition changing function 312, the search condition deleting function 313, and the search condition managing part 310 register and manage search conditions which are used when any of the documents managed by the document managing part 300 is searched for, as will be described later. The search condition managing part 310 stores search condition IDs and the search conditions. Further, the printing format setting-appended search condition registering function 321, the printing format setting-appended search condition changing function 322, the printing format setting-appended search condition deleting function 323, and the printing format setting-appended search condition managing part 320 register and manage printing format setting-appended search conditions, as will be described later. The printing format setting-appended search condition managing part 320 stores IDs of printing format setting-appended search conditions, search conditions, IDs of printing apparatuses, and printing format settings. Further, the printing apparatus registering function 331, the printing apparatus deleting function 332, and the printing apparatus managing part 330 are connected to the Internet 103 to manage the printing apparatuses which print and output the documents managed by the document managing server 100, as will be described later.

Figure 9:
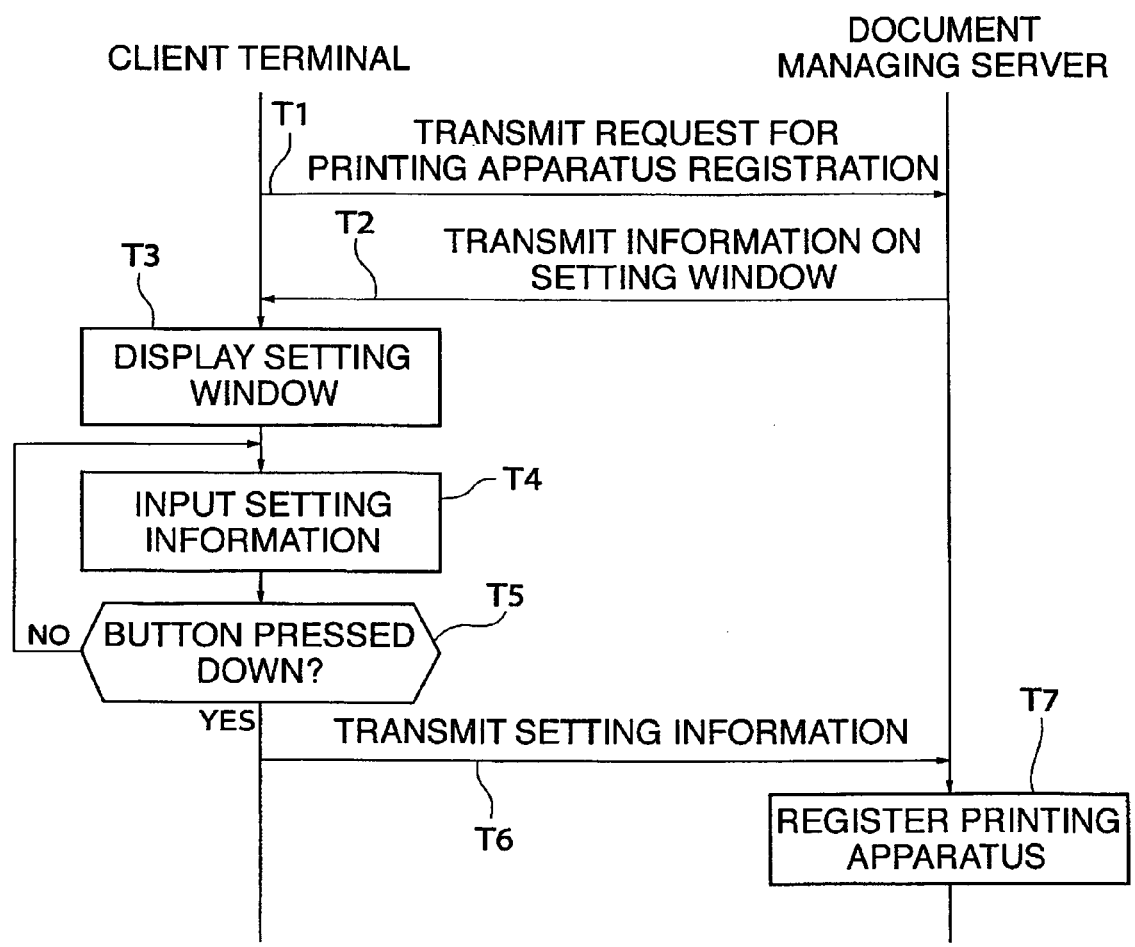
FIG. 9 is a chart showing the flow of printing apparatus registration processing when a printing apparatus is registered in the document managing server 100 by the client terminal 101.

FIG. 9 is a chart showing the flow of printing apparatus registration processing carried out when a printing apparatus is registered in the document managing server 100 by the client terminal 101. Processing on the client terminal side is performed by the CPU 251 executing the program stored in the recording medium in the client terminal 101. Processing on the document managing server 100 side is performed by the CPU 201 executing the program stored in the recording medium in the document managing server 100.

First, the client terminal 101 transmits a request for printing apparatus registration to the document managing server 100 by utilizing the network browsing function (T1). When receiving the registration request, the document managing server 100 transmits information indicating a setting window shown in FIG. 10 to the network browsing function of the client terminal 101 (T2). The client terminal 101 displays the setting window on the display 260 based on the received information indicating the setting window (T3).

Figure 10:
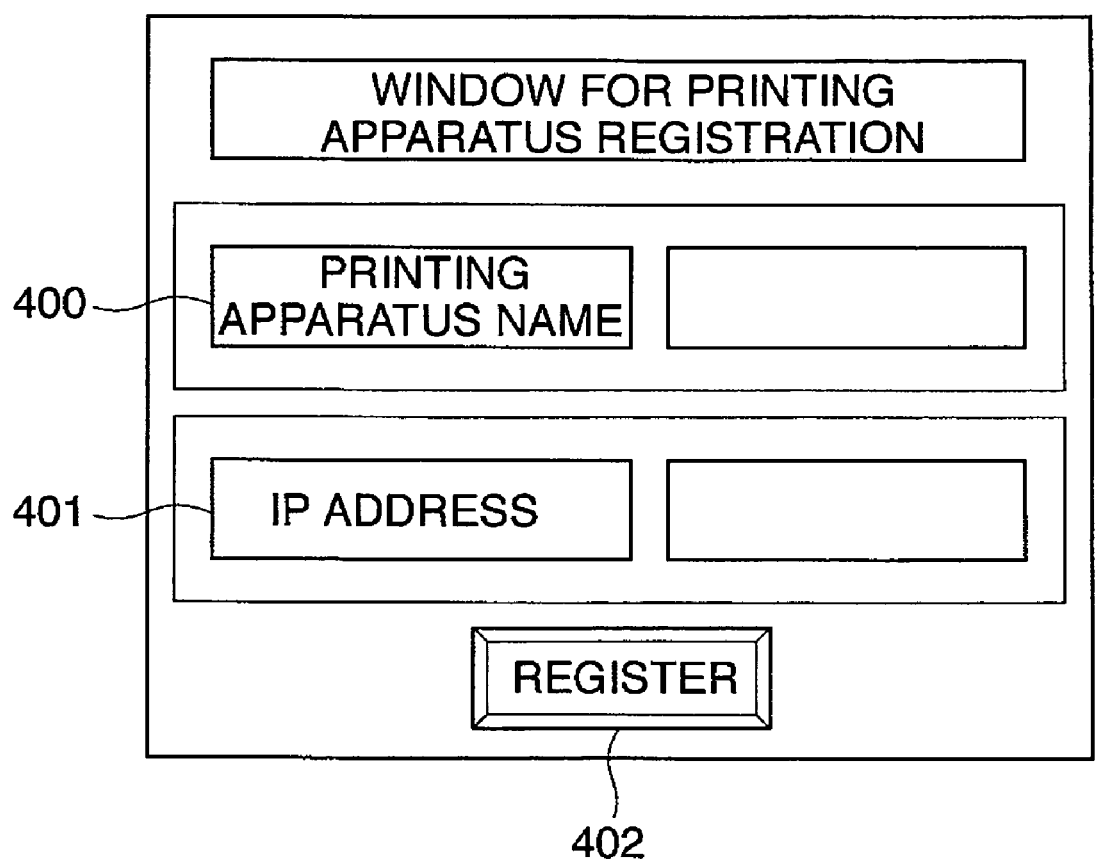
FIG. 10 is a view showing a setting window used when a printing apparatus connected to the Internet 103 is registered by the client terminal 101.

FIG. 10 is a view showing the setting window used when the printing apparatus connected to the Internet 103 is registered from the client terminal 101. In this setting window (window for printing apparatus registration), provided are: a printing apparatus name input area 400 to which the name of a printing apparatus on the network is inputted; a printing apparatus IP address input area 401 to which IP address information for uniquely specifying a printing apparatus on the network is inputted, and a printing apparatus registration button 402. An operations manager of the document managing server 100 utilizes this setting window to register in the document managing server 100 the printing apparatus 102 connected to the Internet 103.

The client terminal 101 accepts setting information inputted by the operations manager (T4) to judge whether or not the printing apparatus registration button 402 has been pressed down (T5). When the printing apparatus registration button 402 has not been pressed down, the client terminal 101 returns to T4, and when the printing apparatus registration button 402 is pressed down, it transmits the inputted setting information to the document managing server 100 side (T6). When receiving the transmitted setting information, the document managing server 100 registers the name and IP address of the printing apparatus in the printing apparatus managing part 330 by the printing apparatus registering function 331 (T7).

Figure 11:
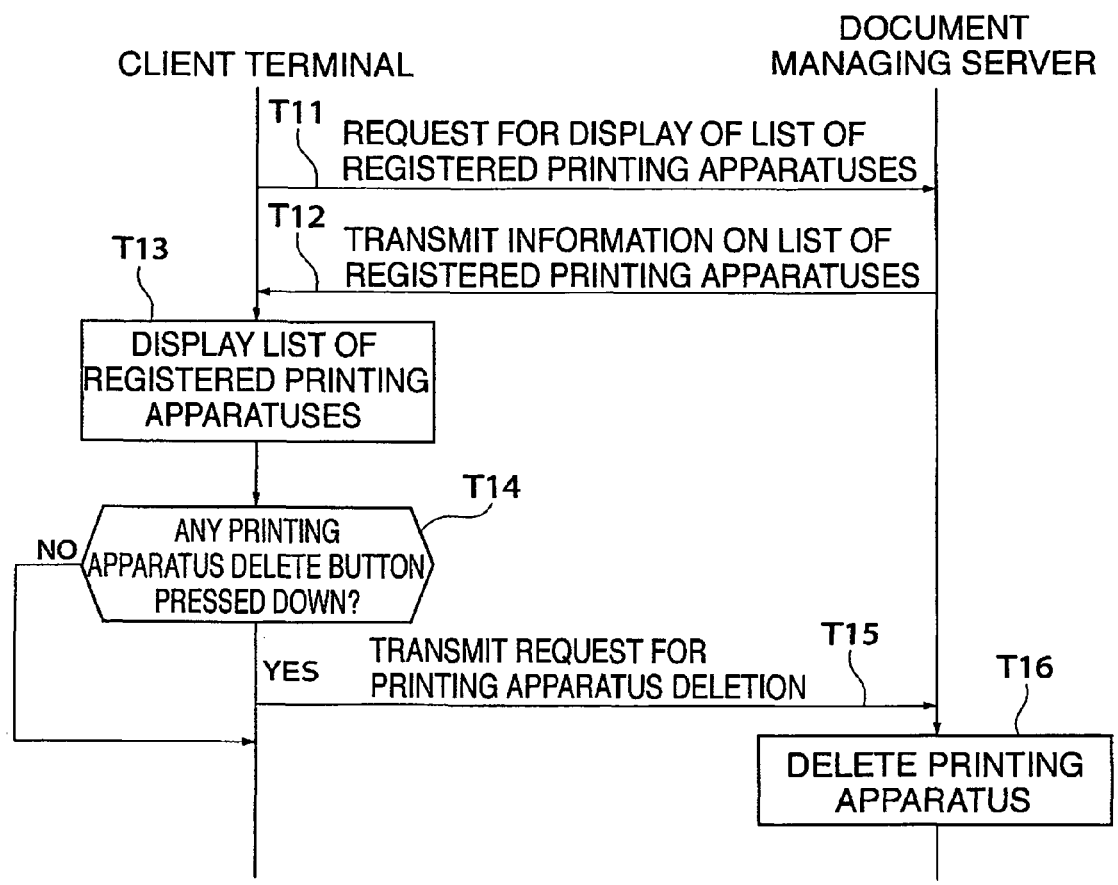
FIG. 11 is a chart showing the flow of deletion processing carried out when a printing apparatus registered in the document managing server 100 is deleted by the client terminal 101.

FIG. 11 is a chart showing the flow of deletion processing carried out when a printing apparatus registered in the document managing server 100 is deleted by the client terminal 101. The client terminal 101 transmits a request for display of a list of the registered printing apparatuses to the document managing server 100 by utilizing the network browsing function (T11). When receiving the request for display of the list of the registered printing apparatuses, the document managing server 100 obtains information from the printing apparatus managing part 330 and transmits information indicating the list of the registered printing apparatuses to the network browsing function of the client terminal 101 (T12). The client terminal 101 displays a setting window shown in FIG. 12 on the display 260 based on the received information indicating the list of the registered printing apparatuses (T13).

Figure 12:
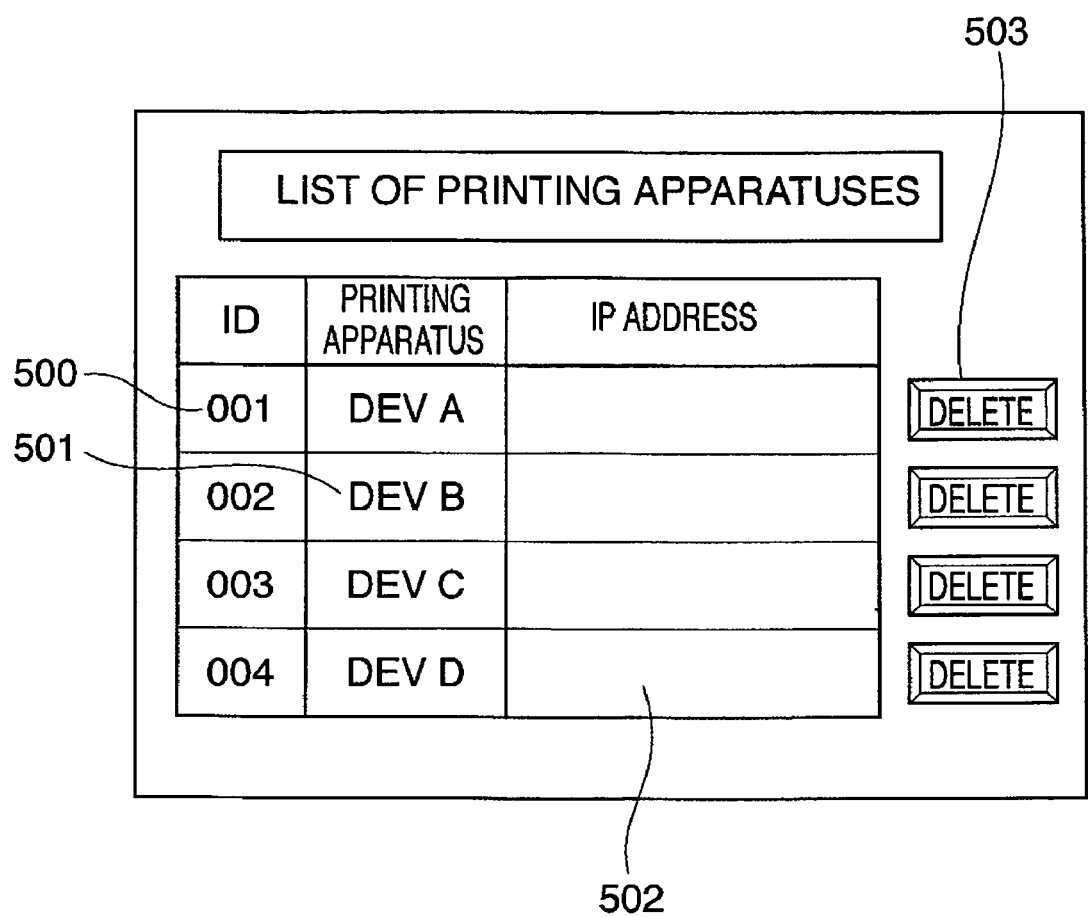
FIG. 12 is a view showing a setting window displaying in the client terminal 101, a list of printing apparatuses registered in the document managing server 100 and used when any of the registered printing apparatuses is deleted from the document managing server 100 by the client terminal 101.

FIG. 12 is a view showing the setting window displaying, in the client terminal 101, the list of the printing apparatuses registered in the document managing server 100 and used when any of the registered printing apparatuses is deleted from the document managing server 100 by the client terminal 101. In this setting window (list of the printing apparatuses), provided are an area 500 displaying registration IDs of the registered printing apparatuses, an area 501 displaying names of the registered printing apparatuses, an area 502 displaying IP addresses of the registered printing apparatuses, and a delete button 503. The operations manager of the document managing server 100 confirms the registered printing apparatuses 102 from the setting window and deletes any of the registered printing apparatuses when necessary.

The client terminal 101 judges whether or not the delete button 503 has been pressed down (T14), and when the delete button 503 has not been pressed down, it performs no processing. On the other hand, when the delete button 503 is pressed down, the client terminal 101 transmits a request for printing apparatus deletion to the document managing server 100 (T15). When receiving the request for printing apparatus deletion, the document managing server 100 deletes the relevant printing apparatus from the printing apparatus managing part 330 by the printing apparatus deleting function 332 (T16).

Figure 13:
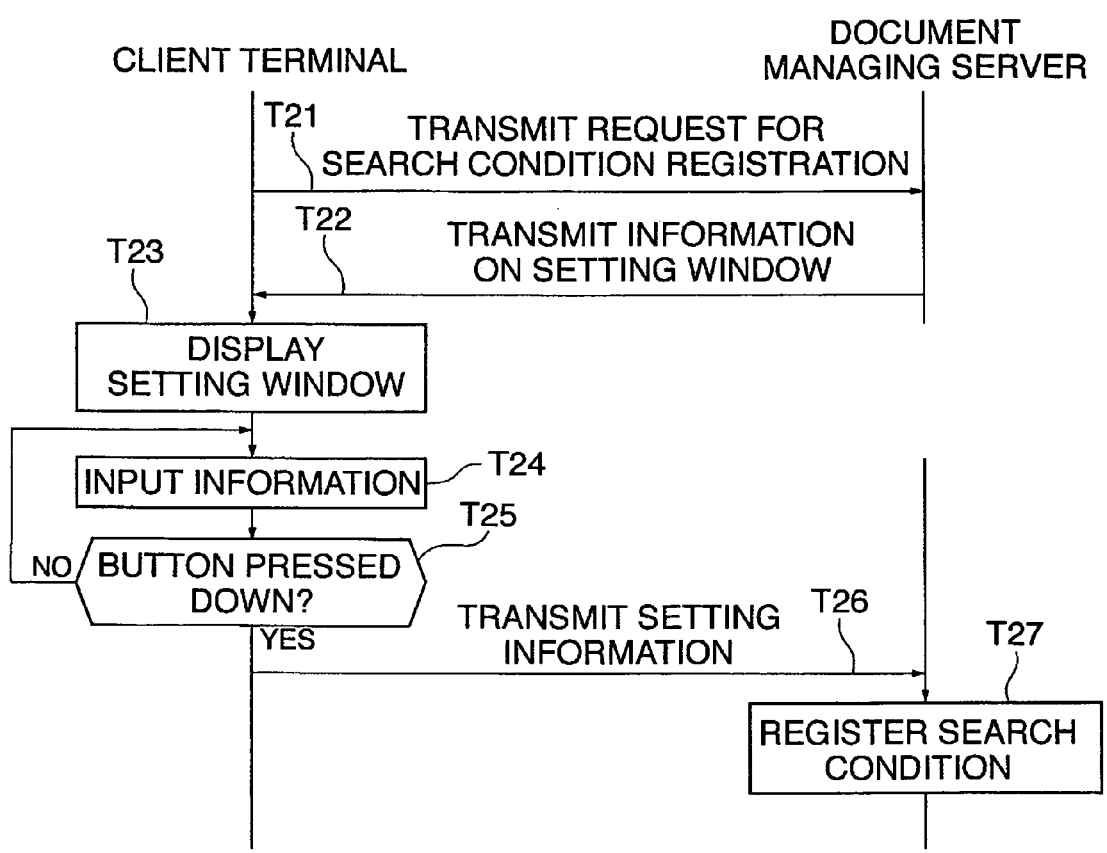
FIG. 13 is a chart showing the flow of search condition registration processing carried out when a search condition of a document is registered in the document managing server 100 by the client terminal 101.

FIG. 13 is a chart showing the flow of search condition registration processing carried out when a search condition of a document is registered in the document managing server 100 by the client terminal 101. The client terminal 101 transmits to the document managing server 100 a request for registration of a search condition used for document search, by utilizing the network browsing function (T21). When receiving the request for search condition registration, the document managing server 100 transmits information indicating a setting window shown in FIG. 14 to the network browsing function of the client terminal 101 (T22). The client terminal 101 displays the setting window on the display 260 based on the transmitted information indicating the setting window (T23).

Figure 14:
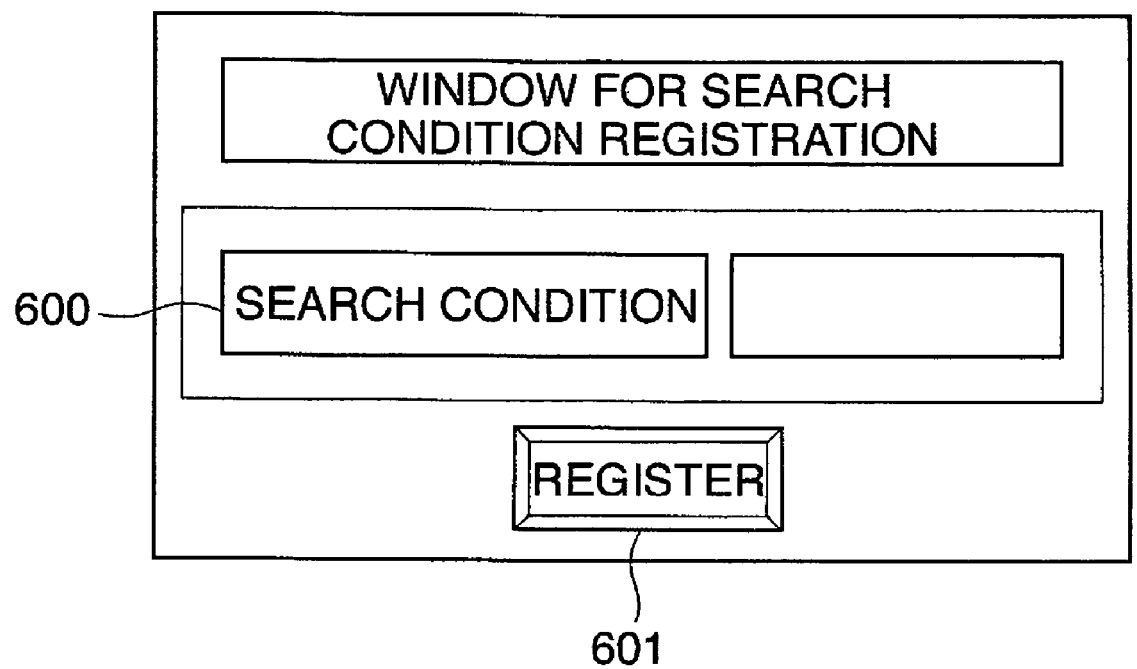
FIG. 14 is a view showing a setting window used when a search condition of a document is registered by the client terminal 101.

FIG. 14 is a view showing the setting window used when a search condition of a document is registered by the client terminal 101. In this setting window (window for search condition registration), a search condition input area 600 and the search condition registration button 601 are provided. To the search condition input area 600, inputted is a character string, which is a search condition as a basis of search for any of the documents managed by the document managing server 100.

The client terminal 101 accepts the character string being the search condition inputted by a user (T24) and judges whether or not the search condition registration button 601 has been pressed down (T25). When the search condition registration button 601 has not been pressed down, the client terminal 101 returns to the processing T24. On the other hand, when the search condition registration button 601 is pressed down, the client terminal 101 transmits the inputted search condition to the document managing server 100 (T26). When receiving the inputted character string, the document managing server 100 registers the inputted search condition in the search condition managing part 310 by the search condition registering function 311 (T27).

Figure 15:
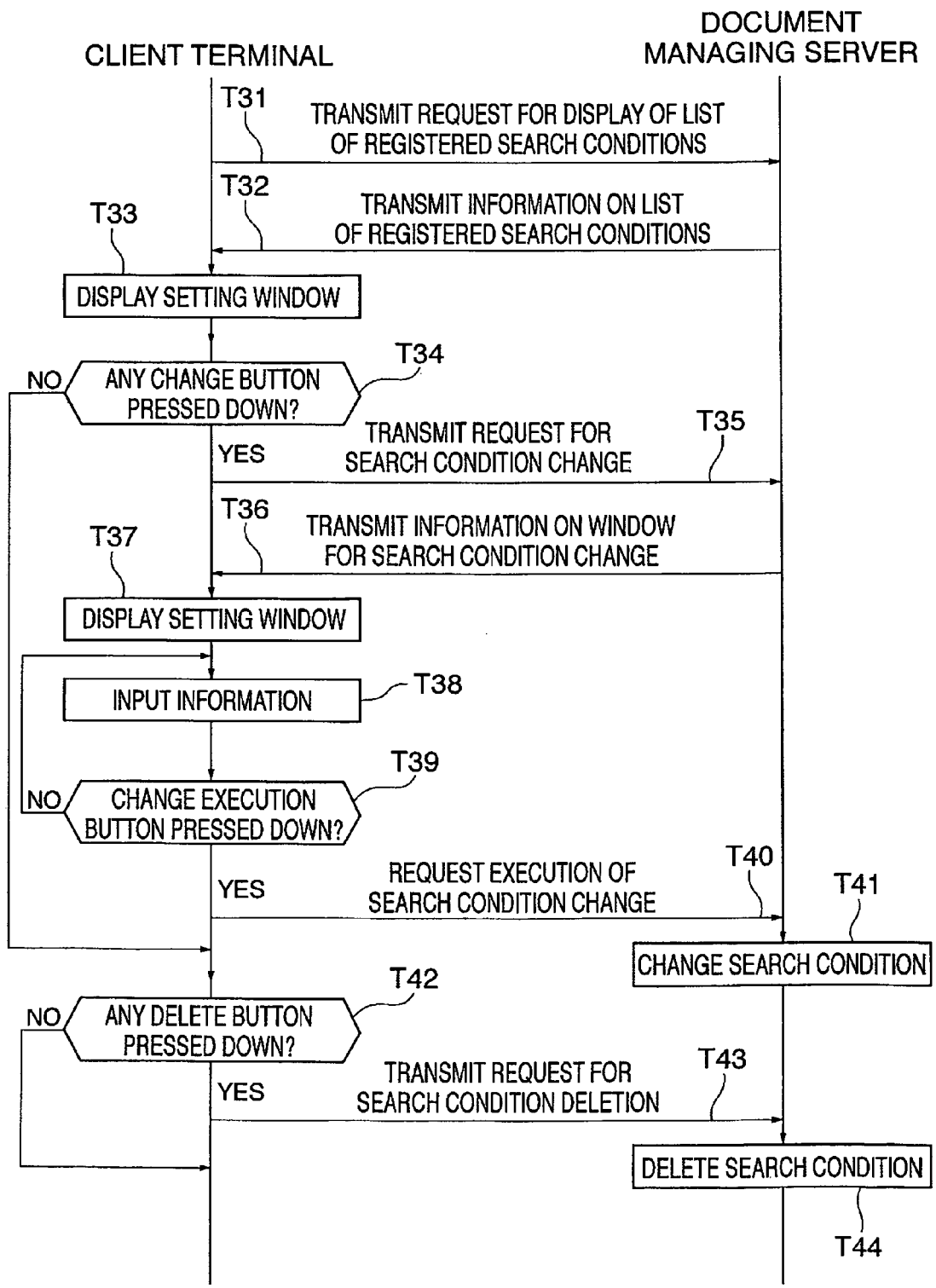
FIG. 15 is a chart showing the flow of search condition deletion processing carried out when a registered search condition in the document managing server 100 is changed or deleted by the client terminal 101.

FIG. 15 is a chart showing the flow of search condition deletion processing when a search condition registered in the document managing server 100 is changed or deleted by the client terminal 101. First, the client terminal 101 transmits to the document managing server 100 a request for display of a list of the registered search conditions by utilizing the network browsing function (T31). When receiving the request for display of the list of the registered search conditions, the document managing server 100 obtains information indicating the list of the registered search conditions from the search condition managing part 310 and transmits the information indicating the list of the registered search conditions to the network browsing function of the client terminal 101 (T32). Based on the information indicating the list of the registered search conditions, the client terminal 101 displays on the display 260 a setting window which includes the list of the search conditions registered in the document managing server 100 and which is used for deleting or changing any of the registered search conditions (T33).

Figure 16:
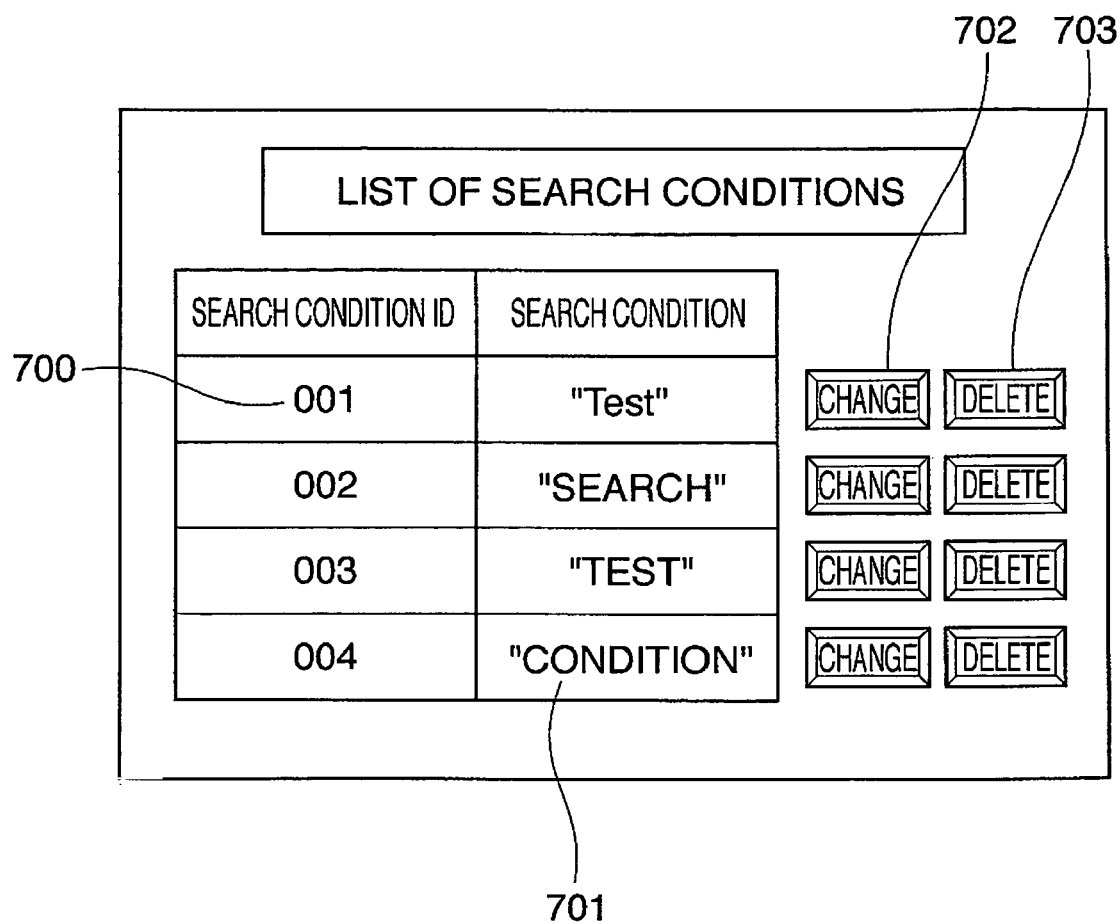
FIG. 16 is a view showing a setting window displaying a list of registered search conditions and used when any of the search conditions is changed or deleted by the client terminal 101.

FIG. 16 is a view showing the setting window that is used when any of the search conditions is deleted or changed by the client terminal 101. In this setting window (list of the document search conditions), provided are an area 700 displaying IDs of the registered search conditions, an area 701 displaying the registered search conditions, search condition change buttons 702, and search condition delete buttons 703.

The client terminal 101 judges whether or not any of the search condition change buttons 702 has been pressed down (T34). When the search condition change button 702 is pressed down, the client terminal 101 transmits a request for search condition change to the document managing server 100 (T35). When receiving the request for search condition change, the document managing server 100 transmits information indicating a window for search condition change to the network browsing function of the client terminal 101 (T36). Based on the transmitted information indicating the window for search condition change, the client terminal 100 displays the setting window shown in FIG. 17 on the display 260 (T37).

Figure 17:
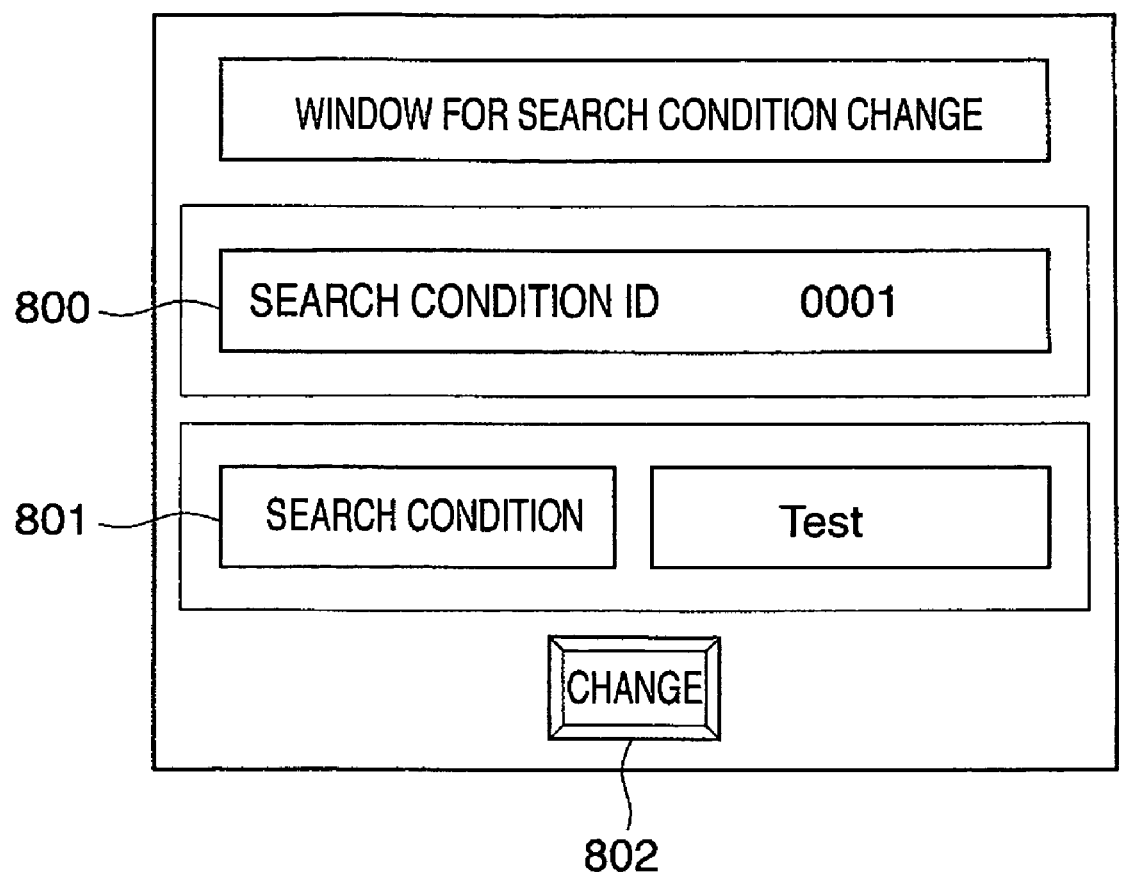
FIG. 17 is a view showing a setting window displayed when any of search condition change buttons 702 is pressed down and used when a search condition registered in the document managing server 100 is changed by the client terminal 101.

FIG. 17 is a view showing the setting window displayed when any of the search condition change buttons 702 is pressed down and used when a search condition registered in the document managing server 100 is changed by the client terminal 101. In this setting window (window for search condition change), provided are an area 800 displaying a registration ID of the registered search condition, an area 801 which displays the registered search condition and to which the correction contents are inputted, and a search condition change execution button 802.

When accepting the correction contents inputted to the area 801 (T38), the client terminal 101 judges whether or not the search condition change execution button 802 has been pressed down (T39). When the search condition change execution button 802 has not been pressed down, the client terminal 101 returns to the processing T38. On the other hand, when the search condition change execution button 802 is pressed down, the client terminal 101 transmits to the document managing server 100 a request for search condition change together with the inputted correction contents (T40). When receiving the request for search condition change, the document managing server 100 changes a search condition designated by the user out of the search conditions managed by the search condition managing part 310, by the search condition changing function 312 based on the correction contents (T41).

On the other hand, when the search condition change button 702 has not been pressed down, the client terminal 101 judges whether or not the search condition delete button 703 has been pressed down (T42). When the search condition delete button 703 is pressed down, the client terminal 101 transmits a request for search condition deletion to the document managing server 100 (T43). When receiving the request for search condition deletion, the document managing server 100 deletes a search condition designated by the user from the search condition managing part 310 by the search condition deleting function 313 (T44). Further, when any of the search condition change buttons 702 and search condition delete buttons 703 has not been pressed down, the search conditions are not changed or deleted and are kept as they are.

Figure 18:
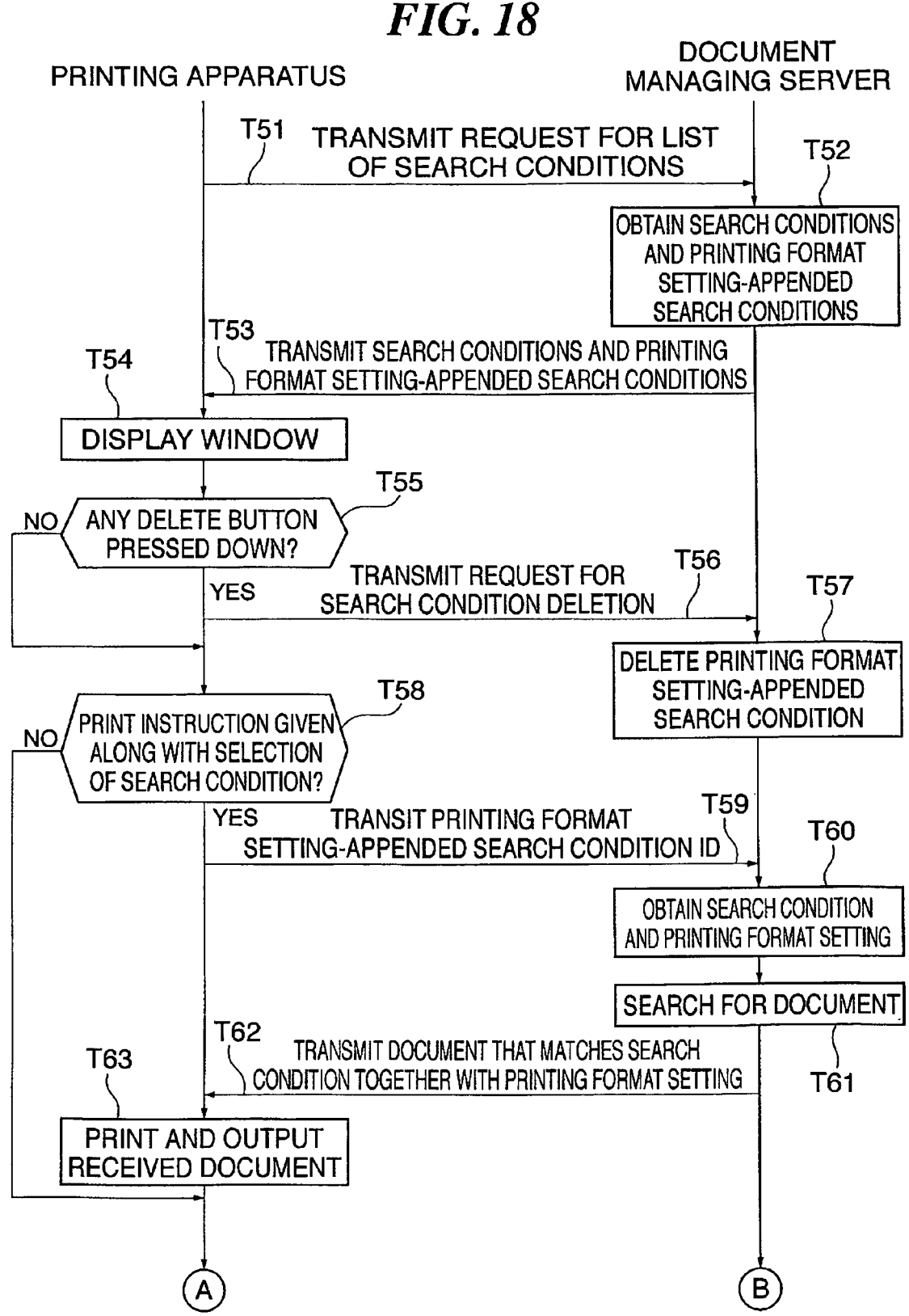
FIG. 18 is a chart showing the flow of search/printing processing in the printing apparatus 102 and the document managing server 100 when a document is searched for and printed.
Figure 19:
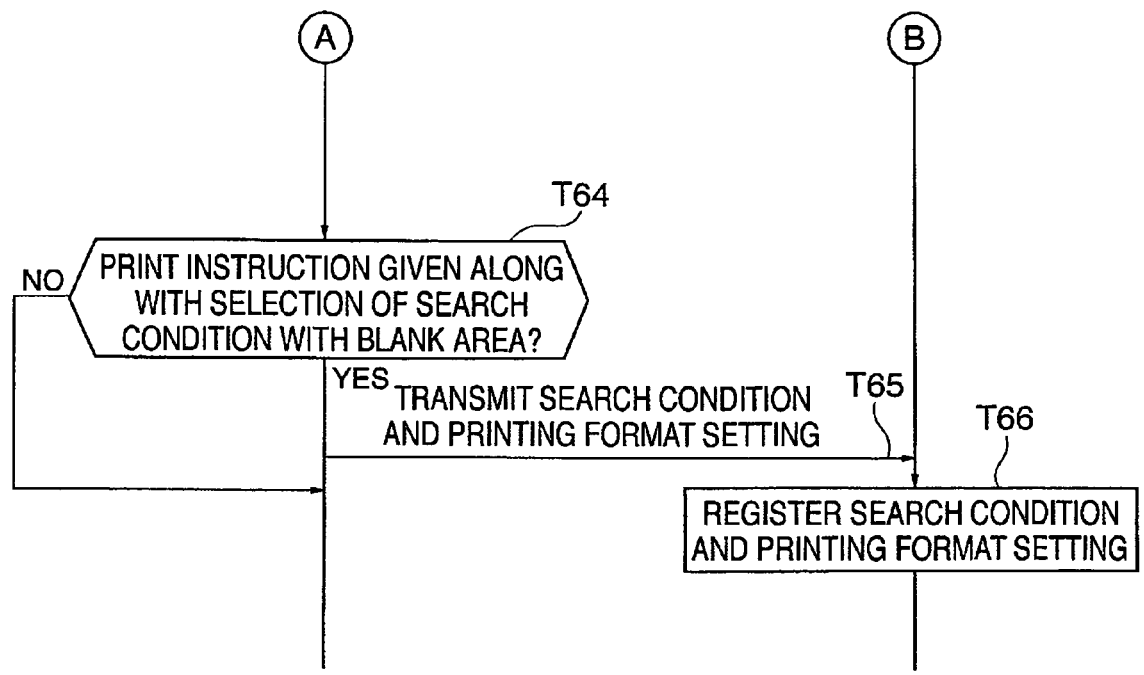
FIG. 19 is a chart, which is continued from FIG. 18, showing the flow of the search/printing processing carried out when the document is searched for and printed by the document managing server 100 and the printing apparatus 102.

FIG. 18 and FIG. 19 are charts showing the flow of search/printing processing carried out when a document is searched for and printed by the document managing server 100 and the printing apparatus 102. First, the printing apparatus 102 transmits a request for the list of the search conditions to the document managing server 100 (T51). When receiving the request for the list of the search conditions, the document managing server 100 obtains the search conditions registered in the search condition managing part 310 and also obtains the printing format setting-appended search conditions registered in the printing format setting-appended search condition managing part 320 (T52). Then, the document managing server 100 transmits to the printing apparatus 102 information indicating the list of the obtained search conditions and printing format setting-appended search conditions (T53). When receiving the information indicating the list of the search conditions and printing format setting-appended search conditions, the printing apparatus 102 displays on the display part 162 of the operation panel 140 a display window for displaying the list of the search conditions based on the received information (T54).

Figure 20:
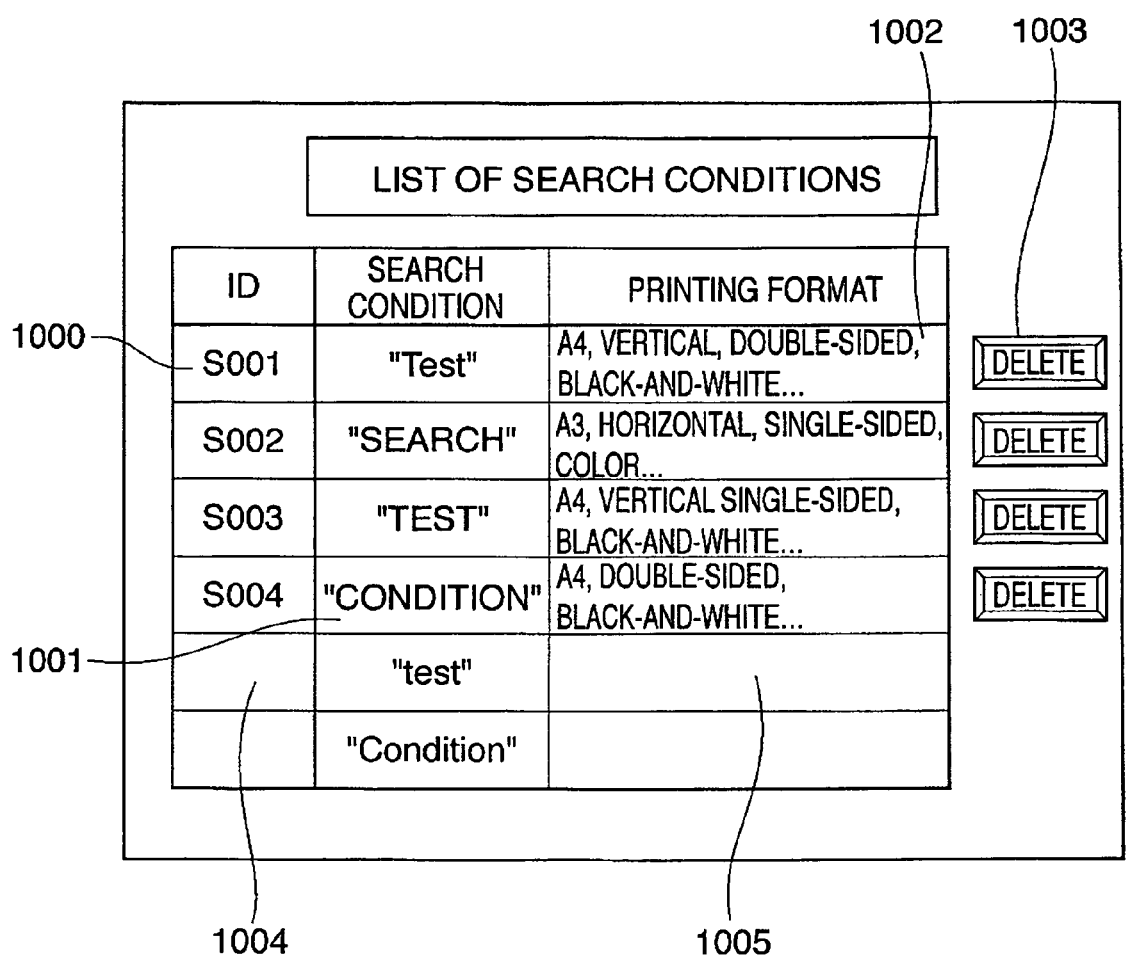
FIG. 20 is a view showing a search condition list-displaying window displayed in the printing apparatus 102.

FIG. 20 is a view showing a search condition list-displaying window displayed in the printing apparatus 102. In this display window, provided are: an area 1000 displaying IDs of the printing format setting-appended search conditions; an area 1001 displaying the search conditions managed by the search condition managing part 310 of the document managing server 100; an area 1002 displaying printing format settings included in the printing format setting-appended search conditions corresponding to the printing apparatus ID of the printing apparatus 102 which requested the list of the search conditions, out of the printing format setting-appended search conditions managed by the printing format setting-appended search condition managing part 320; and printing format setting-appended search condition delete buttons 1003. IDs of the printing format setting-appended search conditions managed by the printing format setting-appended search condition managing part 320 are displayed in the area 1000. In the area 1001, the search conditions managed by the printing format setting-appended search condition managing part 320 are displayed. In the area 1002, the printing format settings managed by the printing format setting-appended search condition managing part 320 are displayed. Here, search conditions whose corresponding area 1004 and area 1005 are blank are not managed by the printing format setting-appended search condition managing part 320 of the document managing server 100 but are managed by the search condition managing part 310. Incidentally, FIG. 20 shows the search condition list in a printing apparatus capable of black-and-white printing and color printing. In the case of a printing apparatus dedicated to black-and-white printing, a search condition corresponding to the ID "S0002" of the printing format setting-appended search condition is not displayed.

The printing apparatus 102 judges whether or not any of the printing format setting-appended search condition delete buttons 1003 has been pressed down (T55). When this button is pressed down, the client terminal 101 transmits a request for deletion of a printing format setting-appended search condition to the document managing server 100 (T56). When receiving the request for search condition deletion, the document managing server 100 deletes the designated printing format setting-appended search condition managed by the printing format setting-appended search condition managing part 320 by the printing format setting-appended search condition deleting function 323 (T57).

On the other hand, when any of the printing format setting-appended search condition delete buttons 1003 has not been pressed down, the printing apparatus 102 judges whether or not the user has given a print instruction while selecting an arbitrary printing format setting-appended search condition from the list of the search condition (T58). When the print instruction is given along with the selection of the search condition, the printing apparatus 102 transmits to the document managing server 100 the printing format setting-appended search condition ID corresponding to the printing format setting-appended search condition selected by the user (T59). When receiving the printing format setting-appended search condition ID, the document managing server 100 obtains a search condition and a printing format setting from the printing format setting-appended search condition managing part 320 and searches for a document registered in the document managing part 300 based on the search condition by utilizing the document searching function 302 (T61). Then, the document managing server 100 transmits to the printing apparatus 102 the document that matches the search condition together with the printing format setting (T62). The printing apparatus 102 prints and outputs the received document according to the received printing format setting (T63).

On the other hand, when no printing format setting-appended search condition has been selected, the printing apparatus 102 judges whether or not the user has given a print instruction while selecting a search condition whose corresponding area 104 and area 105 are blank (T64). When the print instruction is given along with the selection of the search condition whose corresponding area 104 and area 105 are blank, the printing apparatus 102 transmits to the document managing server 100 the selected search condition and a printing format setting set in the printing apparatus 102 (T65). When receiving the search condition and the printing format setting, the document managing server 100 registers, as the printing format setting appended-search condition, the search condition, the printing format, and the printing apparatus ID in the printing format setting-appended search condition managing part 320 by the printing format setting-appended search condition registering function 321 (T66). In this manner, the printing format setting-appended search condition ID is assigned to the registered printing format setting-appended search condition. A possible processing thereafter may be such that the document managing server 100 searches through the documents registered in the document managing part 300 based on the search condition to transmit a document found by the search to the printing apparatus 102, and the printing apparatus 102 prints and outputs the received document according to the set printing format setting. Alternatively, since the printing format setting-appended search condition ID has been already assigned, the processing T51 and subsequent processing may be repeated again for printing and outputting.

FIG. 21 is a view showing an example of printing format setting. In this printing format setting, original size, paper size, number of copies, printing direction, page layout, magnification designation, stamp, page frame, necessity for date printing, necessity for user name printing, necessity for page number printing, processing method, and the like are set as page setting, and as a finish, printing method, combination of papers, binding direction, binding margin, paper discharge method and the like are set. According to such printing format setting, the printing apparatus 102 sets original size such as A4 or A3, output paper size, printing direction, the number of copies printed and the printing method such as single-sided/double-sided printing.

In the above-described manner, in the document managing system of the first embodiment, the printing apparatus 102 gives to the document managing server 100 the designation of a search condition desired by the user from the list of the printing format setting-appended search conditions transmitted from the document managing server 100. Based on this designation, the document managing server 100 searches through the documents managed by the document managing part 300 under the designated search condition and transmits a document that matches the search condition and the printing format setting to the printing apparatus 102. The printing apparatus 102 prints the document that matches the search condition according to the transmitted printing format setting. Therefore, when any of the registered documents is searched for and printed, operability in inputting the search condition and the like from the printing apparatus side can be improved. In addition, repeated setting of the printing format is not necessary at each printing.

Next, a second embodiment of the present invention will be described.

In the above-described first embodiment, when a user gives the print instruction while designating the search condition that was once designated by the user in the past, even a document that was printed once in the past is printed, if this document is a document that matches the search condition out of the documents managed by the document managing part 300 in the document managing server 100.

Figure 22:
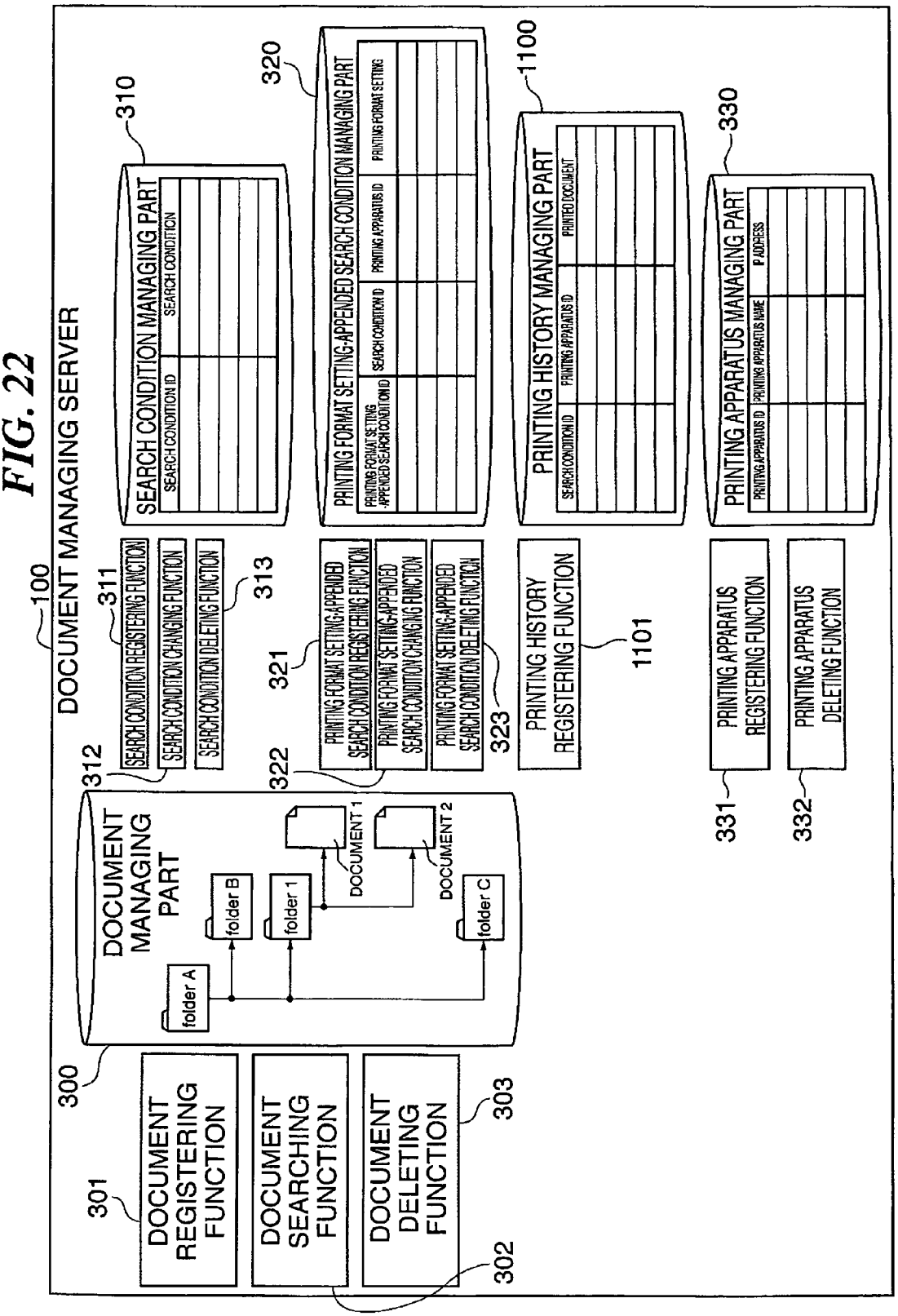
FIG. 22 is a diagram showing the functional configuration of a document managing server 100 according to a second embodiment of the present invention.

In the second embodiment, the document managing server 100 further includes a printing history managing part to prevent repeated printing of a document once printed. The configuration of the whole document managing system is the same as that of the first embodiment. FIG. 22 is a diagram showing the functional configuration of the document managing server 100 according to the second embodiment of the present invention. The document managing server 100 has a printing history managing part 1100 managing document history information and a printing history registering function 1101.

Figure 23:
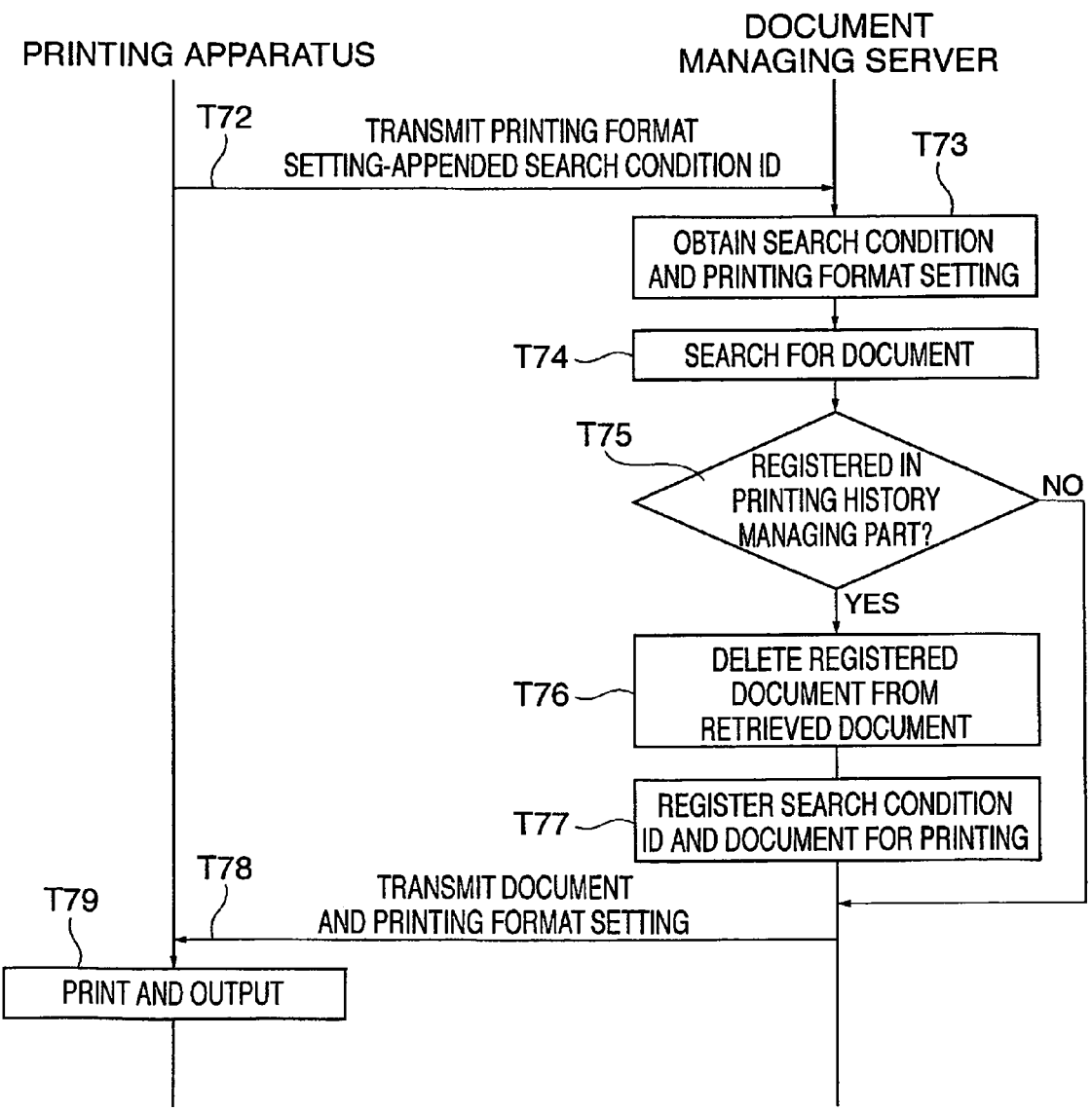
FIG. 23 is a chart showing the flow of search/printing processing carried out when a document is searched for and printed by the document managing server 100 and the printing apparatus 102.

FIG. 23 is a chart showing the flow of search/printing processing carried out when a document is searched for and printed by the document managing server 100 and the printing apparatus 102. The printing apparatus 102 displays on the operation panel 140 the display window (see FIG. 20) for displaying the list of the search conditions, and a user selects an arbitrary search condition from the list of the search conditions to give a print instruction. When receiving the print instruction from the user, the printing apparatus 102 transmits the printing format setting-appended search condition ID to the document managing server 100 (T72). When receiving the printing format setting-appended search condition ID, the document managing server 100 obtains corresponding search condition and printing format setting from the printing format setting-appended search condition managing part 320 (T73) and searches through the documents registered in the document managing part 300 by utilizing the document searching function 302 based on the search condition (T74).

The document managing server 100 judges whether or not documents that match the search condition are registered in the printing history managing part 1100 (T75). When any of them is registered, a document already registered in the printing history managing part 1100 is deleted from the documents that match the search condition (T76). Here, a document not deleted is hereinafter referred to as "the document for printing". The document managing server 100 registers the printing format setting-appended search condition ID and the document for printing in the printing history managing part 1100 by utilizing the printing history registering function 1101 (T77). Further, the document managing server 100 transmits the document for printing and the printing format setting to the printing apparatus 102 (T78). The printing apparatus 102 prints and outputs the received document according to the received printing format setting (T79). On the other hand, when any of the documents that match the search condition is not registered in the printing history managing part 1100, the document managing server 100 jumps directly to the processing T77.

In this manner, in the document managing system of the second embodiment, when a user gives the print instruction while designating the search condition that was once designated by the user in the past, it is possible to automatically delete the document that was once printed in the past, out of the documents for printing, so that repeated printing of the same document can be avoided.

Next, a third embodiment of the present invention will be described.

Figure 24:
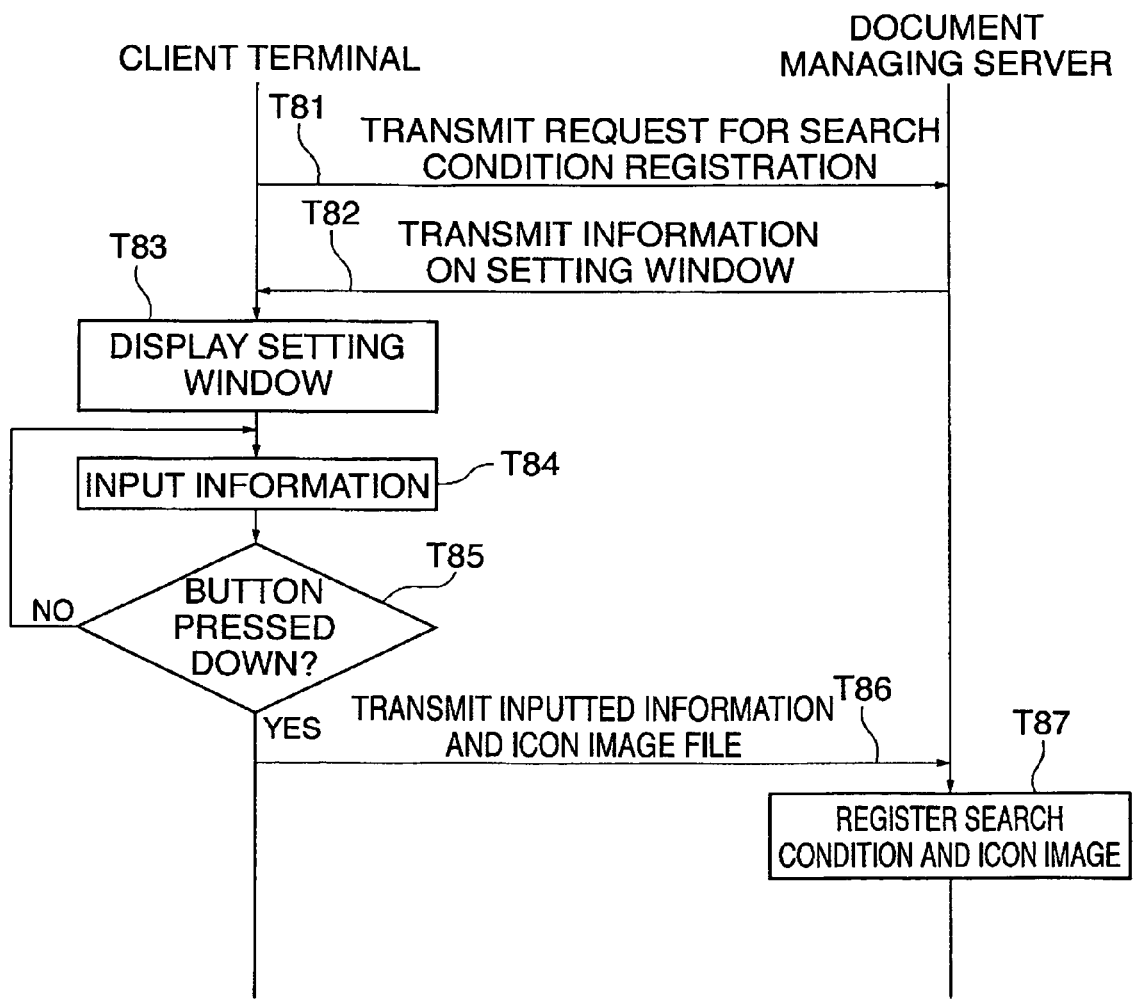
FIG. 24 is a chart showing the flow of registration processing, in a third embodiment of the present invention, carried out when a search condition of a document is registered in the document managing server 100 by the client terminal 101.

FIG. 24 is a chart showing the flow of registration processing, in a third embodiment of the present invention, carried out when a search condition of a document is registered in the document managing server 100 by the client terminal 101. The client terminal 101 transmits a request for search condition registration to the document managing server 100 by utilizing the network browsing function (T81). When receiving the request for search condition registration, the document managing server 100 transmits information indicating a setting window shown in FIG. 25, to the network browsing function of the client terminal 101 (T82). Based on the transmitted information indicating the setting window, the client terminal 101 displays the setting window on the display 260 (T83).

Figure 25:
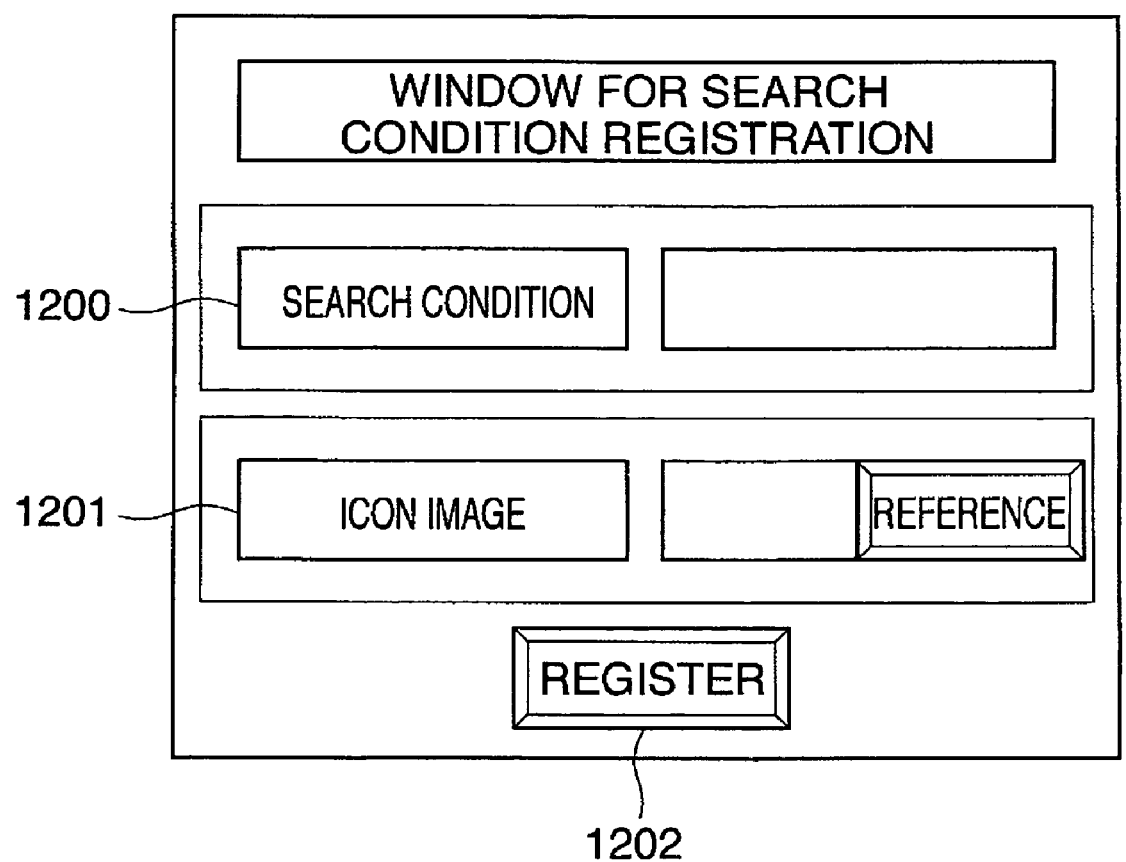
FIG. 25 is a view showing a setting window used when a search condition is registered.

FIG. 25 is a view showing the setting window that is used when a search condition is registered. In this setting window (window for search condition registration), provided are a search condition input area 1200, a search condition icon registration area 1201, and a search condition registration button 1202. A character string as a search condition is inputted to the search condition input area 1200 when any of the document managed by the document managing server 100 is to be searched for. A file path of an icon image file is inputted to the search condition icon registration area 1201.

When accepting information such as the search condition and the file path inputted by a user (T84), the client terminal 101 judges whether or not the search condition registration button 1202 has been pressed down (T85). When the search condition registration button 1202 has not been pressed down, the client terminal 101 returns to the processing T84. On the other hand, when the search condition registration button 1202 is pressed down, the client terminal 101 transmits the inputted search condition and icon image file to the document managing server 100 (T86). When receiving the search condition and the icon image file, the document managing server 100 registers the search condition and the icon image file in the search condition managing part 310 by the search condition registering function 311 (T87).

Figure 26:
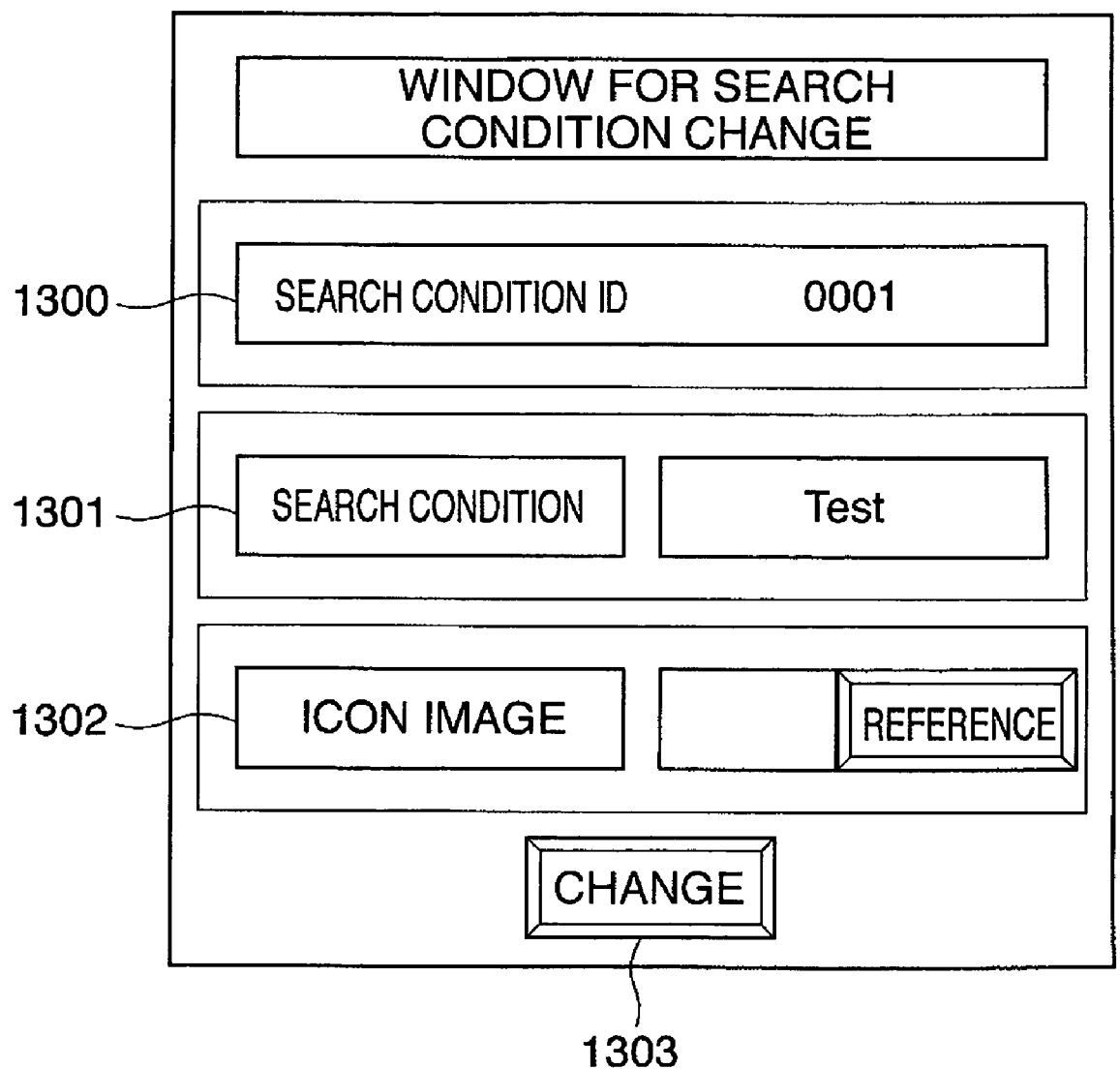
FIG. 26 is a view showing a setting window used when a search condition registered in the document managing server 100 is changed by the client terminal 101.

FIG. 26 is a view showing a setting window used when a search condition registered in the document managing server 100 is changed by the client terminal 101. When the search condition change button 702 (see FIG. 16) in the above-described first embodiment is pressed down for designation, this setting window showing the contents of the search condition is displayed. In this setting window, provided are an area 1300 displaying a search condition ID of the registered search condition, an area 1301 which displays the registered search condition and to which the correction contents are inputted, an area 1302 where the icon image file is designated in order to change a registered icon for a search condition, and a search condition change execution button 1303. Similarly to the above-described first embodiment, as shown in FIG. 15, the client terminal 101 judges whether or not the search condition change execution button 1303 has been pressed down (T39). When the search condition change execution button 1303 is pressed down, the client terminal 101 transmits the request for search condition change to the document managing server 100 (T40). When receiving the request for search condition change, the document managing server 100 changes the search condition managed by the search condition managing part 310 by utilizing the search condition changing function 312 (T41).

In this manner, in the document managing system of the third embodiment, when the printing apparatus 102 displays the window for displaying the list of search conditions (see FIG. 20), the icon image information is transmitted from the document managing server 100 to the printing apparatus 102, which makes it possible to display the icon image for each of the search conditions. Therefore, the user can easily discriminate the search conditions, which can improve visibility and operability of the user.

It should be noted that the present invention is not limited to the configuration of either of the above-described embodiments, but any configuration capable of achieving the functions shown in the claims or the functions included in the configuration of either of the embodiments is applicable.

For example, the above-described embodiments show the examples where a document including one character string as the search condition is searched for, but it goes without saying that the search condition may be a search condition for NOT search, AND search and OR search using a plurality of character strings, and the like.

Further, document data is not limited to a document itself but may include an image, a graphic, a table, a photograph and the like. Moreover, the above-described embodiments show, as the printing apparatus, a multifunctional printer (MFP) having a printing function, a copying function, a facsimile function, and the like. However, it goes without saying that the printing apparatus may be an apparatus designed only as a printer, a copying machine having a printing function, a facsimile machine having a printing function, and the like. Further, in the described example, the printing method of the printing apparatus is the electrophotographic method. However, a printing method of the present invention is not limited to the electrophotographic method, and the present invention is applicable to various kinds of printing methods such as an ink jet method, a thermal transfer method, a thermography method, an electrostatic method, and a discharge breakdown method.

It goes without saying that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium. In this case, the program code itself read from the storage medium realizes the functions of either of the above described embodiments, and hence the program code and a storage medium on which the program code is stored constitute the present invention.

Examples of the storage medium for supplying the program code include a floppy (registered trademark) disk, a hard disk, a magnetic-optical disk, optical disks such as a CD-ROM, a CD-R, a CD-RW, a DVD-ROM, a DVD-RAM, a DVD-RW or a DVD+RW, a magnetic tape, a nonvolatile memory card, a ROM and the like. Alternatively, the program may be supplied by downloading via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

The form of the program may be an object code, a program code executed by an interpreter, or script data supplied to an OS (operating system).

This application claims the benefit of Japanese Application No. 2005-082145, filed Mar. 22, 2005, which is hereby incorporated by reference herein in its entirety.

What is claimed is:

1. A document managing system including a document managing apparatus which communicates via a network with an information processing apparatus and a printing apparatus, comprising:

a document storing unit, in the document managing apparatus, configured to store documents;

an input unit, in the information processing apparatus, configured to input a search condition for searching for a specific document through the documents stored in the document storing unit;

a search condition storing unit, in the document managing apparatus, configured to store the search condition, wherein the search condition is input by the input unit and transmitted from the information processing apparatus to the document managing apparatus via the network;

a transmitting unit, in the document managing apparatus, configured to transmit the search condition stored in the search condition storing unit to the printing apparatus via the network;

a display unit, in the printing apparatus, configured to display the search condition transmitted by the transmitting unit;

a designation unit, in the printing apparatus, configured to designate a search condition based on the search condition displayed by the display unit;

a searching unit, in the document managing apparatus, configured to search through the stored documents for a document that matches the search condition designated by the designating unit; and a document transmitting unit, in the document managing apparatus, configured to transmit to the printing apparatus the document that matches the search condition designated by the designating unit via the network.

2. A document managing system according to claim 1, wherein said search condition storing unit further is configured to change or delete the search condition in response to a request from the information processing apparatus.

3. A document managing system according to claim 1, wherein said document storing unit further is configured to delete a document in response to a request from the information processing apparatus.

4. A document managing system according to claim 1, further comprising a printing apparatus managing unit configured to register a printing apparatus in the document managing apparatus or delete the registered printing apparatus from the document managing apparatus.

5. A document managing system according to claim 1, wherein the search condition storing unit further is configured to store search conditions respectively corresponding to the documents stored in the document storing unit, the transmitting unit further is configured to transmit via the network to the printing apparatus a list of the stored search conditions in response to a request from the printing apparatus, and wherein the display unit further is configured to display the transmitted list of the search conditions on a screen to cause a user to designate a specific search condition from the displayed list of the search conditions.

6. A document managing system according to claim 1, further comprising a history managing unit configured to manage a history of a document that has ever been transmitted to the printing apparatus, and wherein, when the document that matches the search condition is the document that has ever been transmitted to the printing apparatus, said document transmitting unit further is configured not to transmit to the printing apparatus the document that matches the search condition.

7. A non-transitory storing medium storing a computer-readable program code for realizing the document managing system according to claim 1.

8. A document managing system including a document managing apparatus which communicates via a network with an information processing apparatus and a printing apparatus, comprising:
- a document storing unit, in the document managing apparatus, configured to store documents;
- an input unit, in the information processing apparatus, configured to input a search condition for searching for a specific document through the documents stored in the document storing unit;
- a search condition storing unit, in the document managing apparatus, configured to store the search condition and to store a printing format setting corresponding to the search condition, wherein the search condition is input by the input unit and transmitted from the information processing apparatus to the document managing apparatus via the network;
- a transmitting unit, in the document managing apparatus, configured to transmit the search condition stored in the search condition storing unit to the printing apparatus via the network;
- a display unit, in the printing apparatus, configured to display the search condition transmitted by the transmitting unit;
- a designation unit, in the printing apparatus, configured to designate a search condition based on the search condition displayed by the display unit;
- a searching unit, in the document managing apparatus, configured to search through the stored documents for a document that matches the search condition designated by the designating unit and obtain a printing format setting corresponding to the search condition designated by the designating unit;
- a document transmitting unit, in the document managing apparatus, configured to transmit to the printing apparatus the document that matches the search condition designated by the designating unit via the network; and
- a setting transmitting unit, in the document managing apparatus, configured to transmit to the printing apparatus the printing format setting corresponding to the search condition designated by the designating unit via the network.

9. A document managing system according to claim 8, wherein said search condition storing unit further is configured to store the search condition with the printing format setting.

10. A document managing system according to claim 8, wherein the search condition storing unit further is configured to store search conditions respectively corresponding to the documents stored in the document storing unit, the search condition transmitting unit further is configured to transmit via the network to the printing apparatus a list of the stored search conditions in response to a request from the printing apparatus, and wherein the display unit further is configured to display the transmitted list of the search conditions to cause a user to designate a specific search condition from the displayed list of the search conditions.

11. A document managing system according to claim 8, further comprising:
- a history managing unit configured to manage a history of a document that has ever been transmitted to the printing apparatus, and
- wherein, when the document that matches the search condition is the document that has ever been transmitted to the printing apparatus, said document transmitting unit further is configured not to transmit to the printing apparatus the document that matches the search condition.

12. A non-transitory storing medium storing a computer-readable program code for realizing the document managing system according to claim 8.

13. A document searching method for searching for a document in a document managing system including a document managing apparatus which communicates via a network with an information processing apparatus and a printing apparatus, comprising:
- a document registering step, executed in the document managing apparatus, of storing documents in a document storing unit;
- an input step, executed in the information processing apparatus, of inputting a search condition for searching for a specific document through the documents stored in the document storing unit;
- a search condition storing step, executed in the document managing apparatus, of storing the search condition in a search condition storing unit, wherein the search condition is input by the input unit and transmitted from the information processing apparatus to the document managing apparatus via the network;
- a transmitting step, executed in the document managing apparatus, of transmitting the search condition stored in the search condition storing unit to the printing apparatus via the network;
- a displaying step, executed in the printing apparatus, of displaying the search condition transmitted in the transmitting step;
- a designation step, executed in the printing apparatus, of designating a search condition based on the search condition displayed in the display step;
- a searching step, executed in the document managing apparatus, of searching through the documents for a document that matches the search condition designated in the designating step; and
- a document transmitting step, executed in the document managing apparatus, of transmitting to the printing apparatus the document that matches the search condition designated in the designating step via the network.

14. A document searching method for searching for a document in a document managing system including a document managing apparatus which communicates via a network with an information processing apparatus and a printing apparatus, comprising:
- a document registering step, executed in the document managing apparatus, of storing documents in a document storing unit;
- an input step, executed in the information processing apparatus, of inputting a search condition for searching for a specific document through the documents stored in the document storing unit;
- a search condition storing step, executed in the document managing apparatus, of storing the search condition in a search condition storing unit and of storing a printing format setting corresponding to the search condition, wherein the search condition is input in the input step and transmitted from the information processing apparatus via the network;
- a transmitting step, executed in the document managing apparatus, of transmitting the search condition stored in the search condition storing unit to the printing apparatus via the network;

a display step, executed in the printing apparatus, of displaying the search condition transmitted by the transmitting unit;

a designation step, executed in the printing apparatus, of designating a search condition based on the search condition displayed in the display step;

a searching step, executed in the document managing apparatus, of searching through the documents for a document that matches the search condition designated in the designating step and obtaining a printing format setting corresponding to the search condition designated in the designating step;

a document transmitting step, executed in the document managing apparatus, of transmitting to the printing apparatus the document that matches the search condition designated in the designating step via the network; and a setting transmitting step, executed in the document managing apparatus, of transmitting to the printing apparatus the printing format setting corresponding to the search condition designated in the designating step via the network.

15. A document managing apparatus for managing documents, the document managing apparatus communicating via a network with an information processing apparatus and a printing apparatus, comprising:

a document storing unit configured to store documents;

a search condition storing unit configured to store a search condition for searching for a specific document through the documents stored in the document storing unit, wherein the search condition is input by the information processing apparatus and transmitted from the information processing apparatus to the document managing apparatus via the network;

a transmitting unit configured to transmit the search condition stored in the search condition storing unit to the printing apparatus via the network, wherein the transmitted search condition is displayed by the printing apparatus and designated by the printing apparatus;

a searching unit configured to search through the stored documents for a document that matches the search condition designated by the printing apparatus; and a document transmitting unit configured to transmit to the printing apparatus the document that matches the search condition designated by the printing apparatus via the network.

16. A document managing apparatus according to claim 15, wherein the search condition corresponds to a printing format setting.

* * * * *